United States Patent
Fernandez et al.

(10) Patent No.: US 7,438,297 B2
(45) Date of Patent: Oct. 21, 2008

(54) SKI ATTACHMENT FOR A CAMBERING VEHICLE

(75) Inventors: Juan Fernandez, Towaco, NJ (US); Jin Chen Chuang, Taichung (TW)

(73) Assignee: Products of Tomorrow, Inc., Montville, NJ (US)

( * ) Notice: Subject to any disclaimer, the term of this patent is extended or adjusted under 35 U.S.C. 154(b) by 231 days.

(21) Appl. No.: 11/003,287

(22) Filed: Dec. 3, 2004

(65) Prior Publication Data
US 2005/0212245 A1 Sep. 29, 2005

Related U.S. Application Data

(60) Provisional application No. 60/528,166, filed on Dec. 9, 2003.

(51) Int. Cl.
*B62K 5/00* (2006.01)

(52) U.S. Cl. ............ 280/14.27; 280/87.01; 280/87.021; 280/87.041; 280/87.05; 280/11.2; 280/62; 280/220

(58) Field of Classification Search ............. 280/87.01, 280/87.021, 87.041, 87.05, 38, 62, 11.2, 280/220
See application file for complete search history.

(56) References Cited

U.S. PATENT DOCUMENTS

| 1,303,127 | A |   | 5/1919  | Wickman  |         |
|-----------|---|---|---------|----------|---------|
| 1,336,100 | A |   | 4/1920  | Shearer  |         |
| 1,617,357 | A |   | 2/1927  | Walter   |         |
| 1,664,858 | A |   | 4/1928  | Headley  |         |
| 1,745,643 | A | * | 2/1930  | Roessel  | 280/7.12 |
| 1,890,755 | A |   | 12/1932 | Shepherd |         |
| 2,613,083 | A |   | 10/1952 | Moludy   |         |
| 3,179,433 | A | * | 4/1965  | Flack    | 280/8   |
| D219,372  | S |   | 12/1970 | Levy     |         |
| 4,045,048 | A | * | 8/1977  | Irwin    | 280/278 |
| 4,047,732 | A |   | 9/1977  | Williams et al. |  |

(Continued)

FOREIGN PATENT DOCUMENTS

CA 2390224 A1 5/2001

(Continued)

OTHER PUBLICATIONS

Don Sherman, "Camber Jamboree," Car and Driver Magazine, Jan. 1981, pp. 53-61, USA.

*Primary Examiner*—Christopher Ellis
*Assistant Examiner*—Cynthia F. Collado
(74) *Attorney, Agent, or Firm*—Lerner, David, Littenberg, Krumholz & Mentlik, LLP

(57) ABSTRACT

A cambering vehicle for human propelled transport comprises an elongate front column, first and second pivot axles at the front column, a first trailing arm pivotally attached to the first pivot axle, a second trailing arm pivotally attached to the second pivot axle, a front ski associated with the elongate front column, and, first and second rear skis associated with said first and second trailing arms. The first and second pivot axles may be inclined downward. Separately, a ski may be adapted for attachment to a conventional cambering vehicle having a front tube with a fork, where the ski comprises a surface having a rear section, mid-section, and front section, the surface being relatively flat at its rear section and mid-section, but curving upward at its front section, and an attachment mechanism for attachment to the fork.

22 Claims, 27 Drawing Sheets

U.S. PATENT DOCUMENTS

| | | | |
|---|---|---|---|
| 4,050,711 A * | 9/1977 | Denzer | 280/278 |
| 4,050,712 A | 9/1977 | Denzer et al. | |
| 4,050,713 A | 9/1977 | Williams | |
| 4,054,300 A | 10/1977 | Winchell | |
| 4,065,146 A | 12/1977 | Denzer | |
| 4,071,261 A | 1/1978 | Winchell | |
| 4,076,270 A | 2/1978 | Winchell | |
| 4,087,104 A | 5/1978 | Winchell et al. | |
| 4,087,106 A * | 5/1978 | Winchell | 280/14.28 |
| 4,087,107 A | 5/1978 | Winchell | |
| 4,087,108 A | 5/1978 | Winchell | |
| 4,088,338 A | 5/1978 | Winchell et al. | |
| 4,123,079 A | 10/1978 | Biskup | |
| 4,133,551 A | 1/1979 | Biskup | |
| 4,165,093 A | 8/1979 | Biskup | |
| 4,325,565 A | 4/1982 | Winchell | |
| 4,526,390 A | 7/1985 | Skolnik | |
| 4,540,192 A | 9/1985 | Shelton | |
| RE32,031 E | 11/1985 | Winchell | |
| D291,211 S | 8/1987 | Man | |
| 4,776,604 A | 10/1988 | Valdez et al. | |
| 4,844,494 A | 7/1989 | Blanchard | |
| 5,039,121 A | 8/1991 | Holter | |
| 5,064,208 A * | 11/1991 | Bibollet | 280/21.1 |
| 5,427,390 A * | 6/1995 | Duncan et al. | 280/8 |
| 5,547,204 A | 8/1996 | Gamzo | |
| 5,785,331 A | 7/1998 | Rappaport | |
| 6,220,612 B1 | 4/2001 | Beleski, Jr. | |
| D444,184 S | 6/2001 | Kettler | |
| 6,286,845 B1 | 9/2001 | Lin | |
| 6,318,741 B1 | 11/2001 | Chen | |
| 6,343,798 B1 | 2/2002 | Chen et al. | |
| 6,367,829 B1 | 4/2002 | Lee | |
| 6,378,879 B2 | 4/2002 | Rappaport | |
| 6,428,021 B1 | 8/2002 | Tung | |
| 6,431,301 B1 * | 8/2002 | Forbes | 180/185 |
| 6,450,517 B1 | 9/2002 | Lee | |
| 6,467,781 B1 | 10/2002 | Feng | |
| 6,485,039 B1 | 11/2002 | Ming-Fu | |
| 6,499,751 B1 | 12/2002 | Beleski, Jr. | |
| 6,517,093 B2 | 2/2003 | Feng | |
| 6,554,302 B1 | 4/2003 | Liu | |
| 6,575,479 B2 * | 6/2003 | Combs | 280/21.1 |
| 6,719,310 B1 | 4/2004 | Lin | |
| 6,739,606 B2 * | 5/2004 | Rappaport | 280/87.041 |
| 6,827,358 B2 | 12/2004 | Beleski, Jr. | |
| 6,908,091 B2 * | 6/2005 | Chuang | 280/87.041 |
| 6,983,941 B2 * | 1/2006 | Moscaret et al. | 280/8 |
| 2001/0003392 A1 | 6/2001 | Rappaport | |
| 2002/0050695 A1 | 5/2002 | Feng | |
| 2002/0053775 A1 | 5/2002 | Feng | |
| 2002/0063406 A1 | 5/2002 | Feng | |
| 2002/0063411 A1 | 5/2002 | Feng | |
| 2002/0064417 A1 | 5/2002 | Feng | |
| 2002/0070519 A1 | 6/2002 | Rappaport | |
| 2003/0006569 A1 | 1/2003 | Combs | |
| 2003/0090076 A1 | 5/2003 | Beleski, Jr. | |
| 2004/0032105 A1 | 2/2004 | Tsai | |
| 2004/0178597 A1 | 9/2004 | Tang | |

FOREIGN PATENT DOCUMENTS

| | | |
|---|---|---|
| WO | WO-92/00217 A1 | 1/1992 |
| WO | WO-01/32470 A2 | 5/2001 |
| WO | WO-01/32470 A3 | 5/2001 |

\* cited by examiner

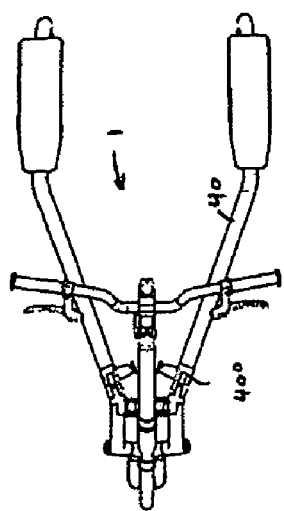
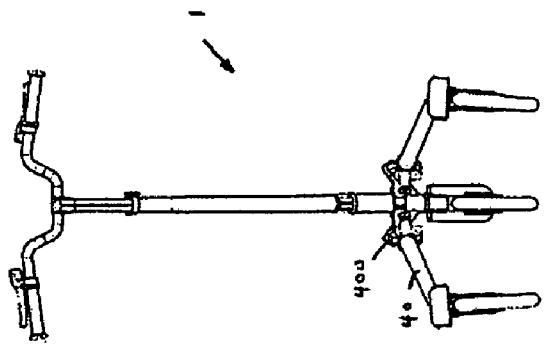
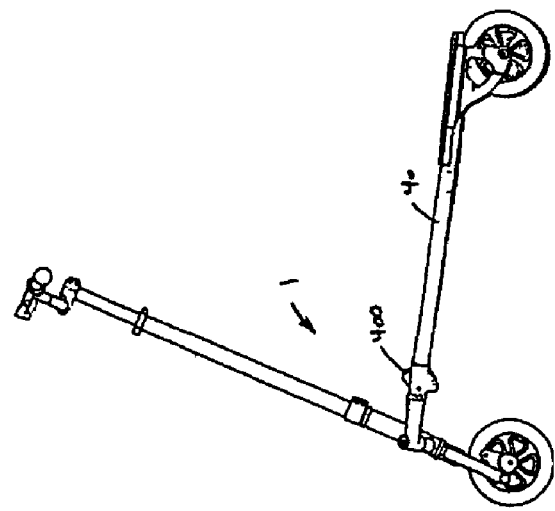
FIG. 18A
FIG. 18C
FIG. 18B

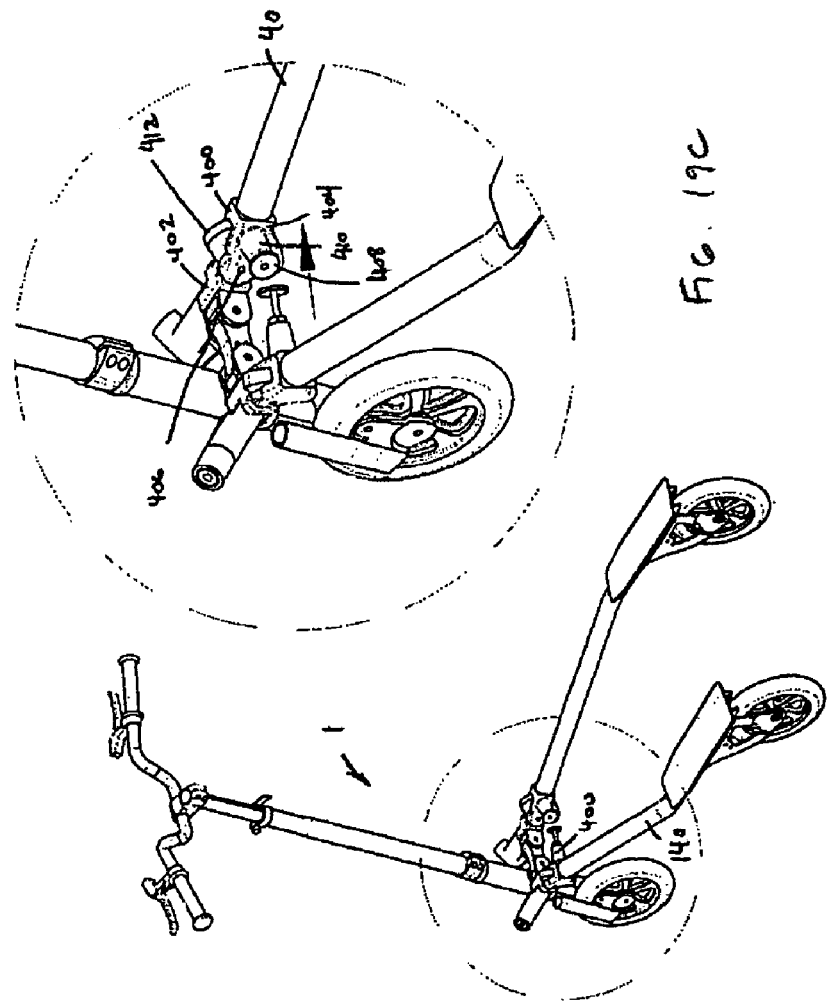
FIG. 19C
FIG. 19B
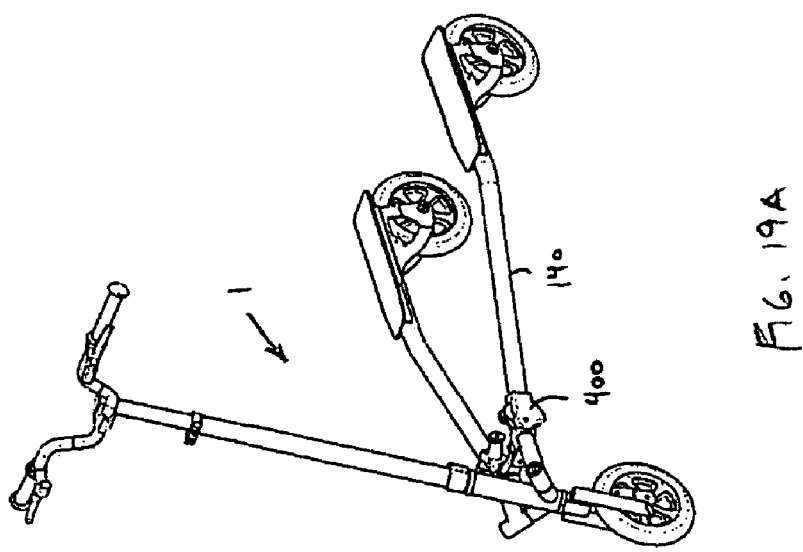
FIG. 19A

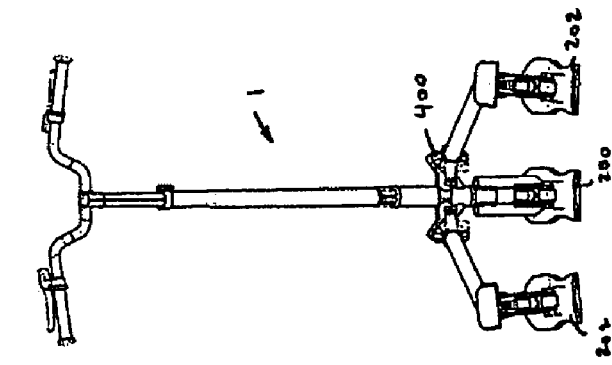
FIG. 21C
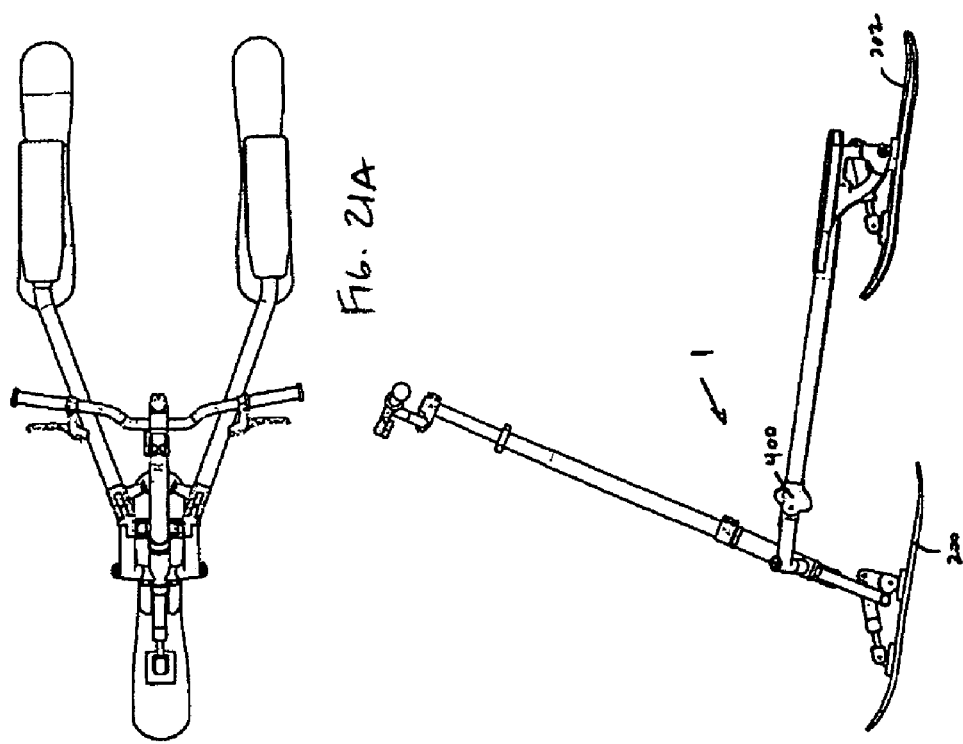
FIG. 21A
FIG. 21B

SKI ATTACHMENT FOR A CAMBERING VEHICLE

CROSS-REFERENCE TO RELATED APPLICATIONS

This application claims the benefit of the filing date of U.S. Provisional Patent Application No. 60/528,166 filed Dec. 9, 2003, the disclosure of which is hereby incorporated herein by reference.

The present application also relates to U.S. application Ser. No. 29/188,772, filed Aug. 22, 2003 (now U.S. Pat. No. D495,758), U.S. application Ser. No. 29/188,760 filed Aug. 22, 2003 (now U.S. Pat. No. D495,374), U.S. application Ser. No. 10/638,446, filed Aug. 11, 2003, U.S. application Ser. No. 10/638,449 filed Aug. 11, 2003, U.S. application Ser. No. 10/638,786, filed Aug. 11, 2003, U.S. application Ser. No. 10/608,399, filed Jun. 23, 2003 and U.S. application Ser. No. 10/608,398, filed Jun. 23, 2003, the disclosures of which are hereby incorporated herein by reference.

BACKGROUND OF THE INVENTION

Cambering vehicles of the type having a single front wheel extending from a vertical steering stem's lower extremity and two rear wheels, each attached to one of a pair of horizontal trailing arms pivotally attached to the steering stem are known. Typically, handlebars attach to the steering stem's upper extremity to permit manipulation of the single wheel. Above the rear wheels on each of the trailing arms are platforms for the user to stand on while operating the vehicle. More complex vehicles also include additional elements, including brakes.

To move the vehicle, the operator stands upon platforms provided on each trailing arm. By alternately leaning left and right, the vehicle will camber left and right. This cambering induces a force between the rear wheels and a surface upon which the vehicle is placed. The force produces work driving the vehicle forward along a sinusoidal path, the frequency of which is related to the user's input of alternate leans and the amplitude of which is related to the speed of the vehicle.

Until now, such vehicles have only been operable on dry land. It has been found, however, that ski attachments may be provided to such vehicles to enable their use on snow, ice or water. Particularly when utilized on a downhill ski slope or on water when pulled by a powered vehicle, use of cambering vehicles with ski attachments has been found to be quite enjoyable. It would therefore be beneficial to provide a cambering vehicle which may be adapted for use on dry land, snow, ice, or water.

It would also be beneficial to provide a ski attachment which may be retrofitted to a conventional cambering vehicle.

SUMMARY OF THE INVENTION

The present invention overcomes the shortcomings of the prior art by providing, in certain embodiments, a cambering vehicle for human propelled transport on snow, ice, or water, where the cambering vehicle includes skis. In other embodiments, the present invention comprises skis which may be adapted for use with a conventional cambering vehicle.

In accordance with one aspect of the present invention, there is provided a cambering vehicle for human propelled transport comprising an elongate front column, first and second pivot axles at the front column, a first trailing arm pivotally attached to the first pivot axle, a second trailing arm pivotally attached to the second pivot axle, a front ski associated with the elongate front column, and first and second rear skis associated with the first and second trailing arms.

The cambering vehicle may further comprise a handlebar associated with the front column, the handlebar being adapted to selectively rotate the front ski.

The cambering vehicle may further comprise a brake lever associated with the handlebar and a brake mechanism associated with the first rear ski, the brake lever may be adapted to selectively engage and disengage the brake mechanism to selectively slow the cambering vehicle. The brake mechanism may be engaged when the brake lever is farthest from the handlebar and may be disengaged when the brake lever is closest to the handlebar.

The cambering vehicle may be adapted for use on snow, ice, or water.

The cambering vehicle may further comprise folding mechanisms associated with each of the trailing arms, the folding mechanisms incorporating a pivot pin about which the trailing arms may fold.

The front ski may further comprise a suspension component to dampen movement of the front ski relative to the front column. The suspension component may be a shock absorber. The suspension component may be a bushing.

The first rear ski may further comprise a suspension component to dampen movement of the first rear ski relative to the first trailing arm.

The first and second pivot axles may be inclined downward.

In accordance with other aspects of the present invention, a kit including components capable for adaptation into a cambering vehicle for human propelled transport may be provided, the kit comprising a base unit having an elongate front column, first and second pivot axles at the front column, a first trailing arm pivotally attached to the first pivot axle, and a second trailing arm pivotally attached to the second pivot axle, a front ski and a front wheel, each of the front ski and the front wheel adapted to be independently associated with the elongate front column, a first rear ski and a first rear wheel, each of the first rear ski and the first rear wheel adapted to be independently associated with the first trailing arm, and, a second rear ski and a second rear wheel, each of the second rear ski and the second rear wheel adapted to be independently associated with the second trailing arm.

The front ski, the first rear ski, and the second rear ski may be associated with the base unit in a first configuration to assemble a cambering vehicle for use on snow, ice, or water.

The front wheel, the first rear wheel, and the second rear wheel may be associated with the base unit in a second configuration to assemble a cambering vehicle for use on land.

In accordance with further aspects of the present invention, a cambering vehicle for human propelled transport may comprise an elongate front column, first and second pivot axles at the front column, a first trailing arm pivotally attached to the first pivot axle, and, a second trailing arm pivotally attached to the second pivot axle, wherein the front column, the first trailing arm, and the second trailing arm are adapted for connection with either wheels or a skis.

The first and second pivot axles may be inclined downward.

In accordance with additional aspects of the present invention, a ski adapted for attachment to a conventional cambering vehicle having a front tube with a fork may be provided, the ski comprising a surface having a rear section, mid-section, and front section, the surface being relatively flat at its rear section and mid-section, but curving upward at its front section, and an attachment mechanism for attachment to the fork.

The conventional cambering vehicle may further comprise an axle associated with the fork, the attachment mechanism may further comprise a member having an aperture therethrough, the aperture adapted to receive the axle of the fork.

In accordance with still further aspects of the present invention, a method of converting a conventional cambering vehicle adapted for use on land into a cambering vehicle adapted for use on snow, ice, or water, is provided, wherein the conventional cambering vehicle includes a front tube having a front fork with a wheel connected to the front fork by an axle, the method comprising removing the axle and wheel from the front fork, replacing the wheel with a ski, and, reinserting the axle through fork and a portion of the ski to connect the ski to the fork.

In accordance with still additional aspects of the present invention, a kit including components for adaptation of a conventional cambering vehicle for human propelled transport on land into a cambering vehicle for human propelled transport on snow, ice, or water is provided, the kit comprising a front ski, a first rear ski, and a second rear ski, each of the skis including members adapted to be connected to the conventional cambering vehicle to enable the cambering vehicle to be utilized for human propelled transport on snow, ice, or water.

The conventional cambering vehicle may include wheels, the front ski, first rear ski, and second rear ski being capable of connection with the cambering vehicle with the wheels still in place.

In accordance with further aspects of the present invention, a cambering vehicle for human propelled transport may comprise an elongate front column, first and second pivot axles at the front column, a first trailing arm pivotally attached to the first pivot axle, a second trailing arm pivotally attached to the second pivot axle, a ski associated with the elongate front column, the first trailing arm, and said second trailing arm.

In accordance with still additional aspects of the present invention, a cambering vehicle for human propelled transport may comprise an elongate front column, first and second pivot axles at said front column, a first trailing arm pivotally attached to said first pivot axle, a second trailing arm pivotally attached to said second pivot axle, a first ski associated with said elongate front column, and a second ski associated with said first trailing arm and said second trailing arm.

BRIEF DESCRIPTION OF THE DRAWINGS

The subject matter regarded as the invention is particularly pointed out and distinctly claimed in the concluding portion of the specification. The invention, however, both as to organization and method of operation, together with features, objects, and advantages thereof may best be understood by reference to the following detailed description when read with the accompanying drawings in which:

FIG. 18A depicts a top view of a cambering vehicle in accordance with other aspects of the present invention;

FIG. 18B depicts a side view of the cambering vehicle of FIG. 18A;

FIG. 18C depicts a rear view of the cambering vehicle of FIG. 18A;

FIG. 19A depicts a side perspective view of the cambering vehicle of FIG. 18A;

FIG. 19B depicts a rear perspective view of the cambering vehicle of FIG. 18A;

FIG. 19C depicts a blow-up view of certain aspects of FIG. 19B;

FIG. 21A depicts a top view of a cambering vehicle in accordance further aspects of the present invention;

FIG. 21B depicts a side view of the cambering vehicle of FIG. 21A;

FIG. 21C depicts a rear view of the cambering vehicle of FIG. 21A;

DETAILED DESCRIPTION

Figure 1:
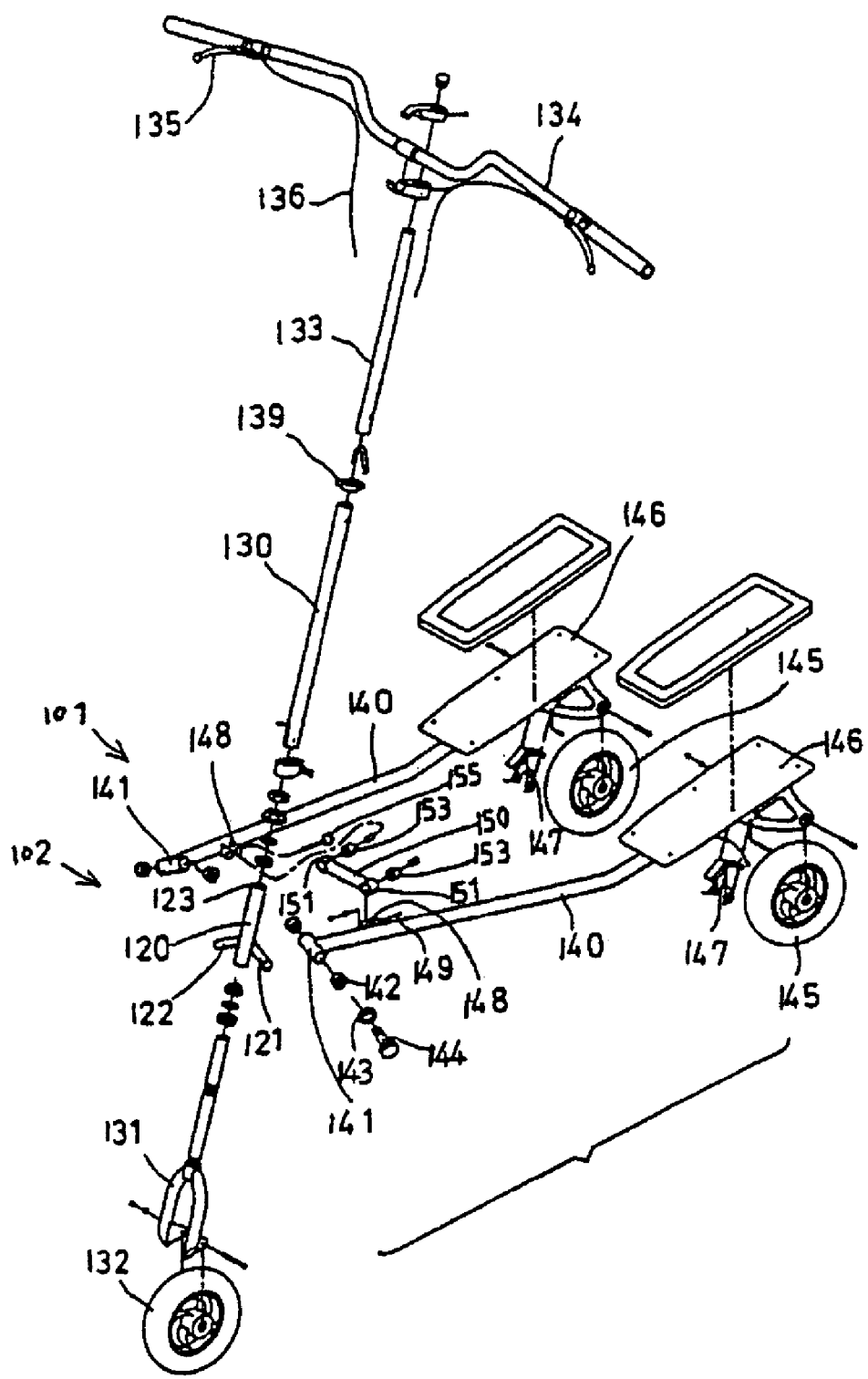
FIG. 1 is an exploded view of a conventional cambering vehicle.
Figure 2:
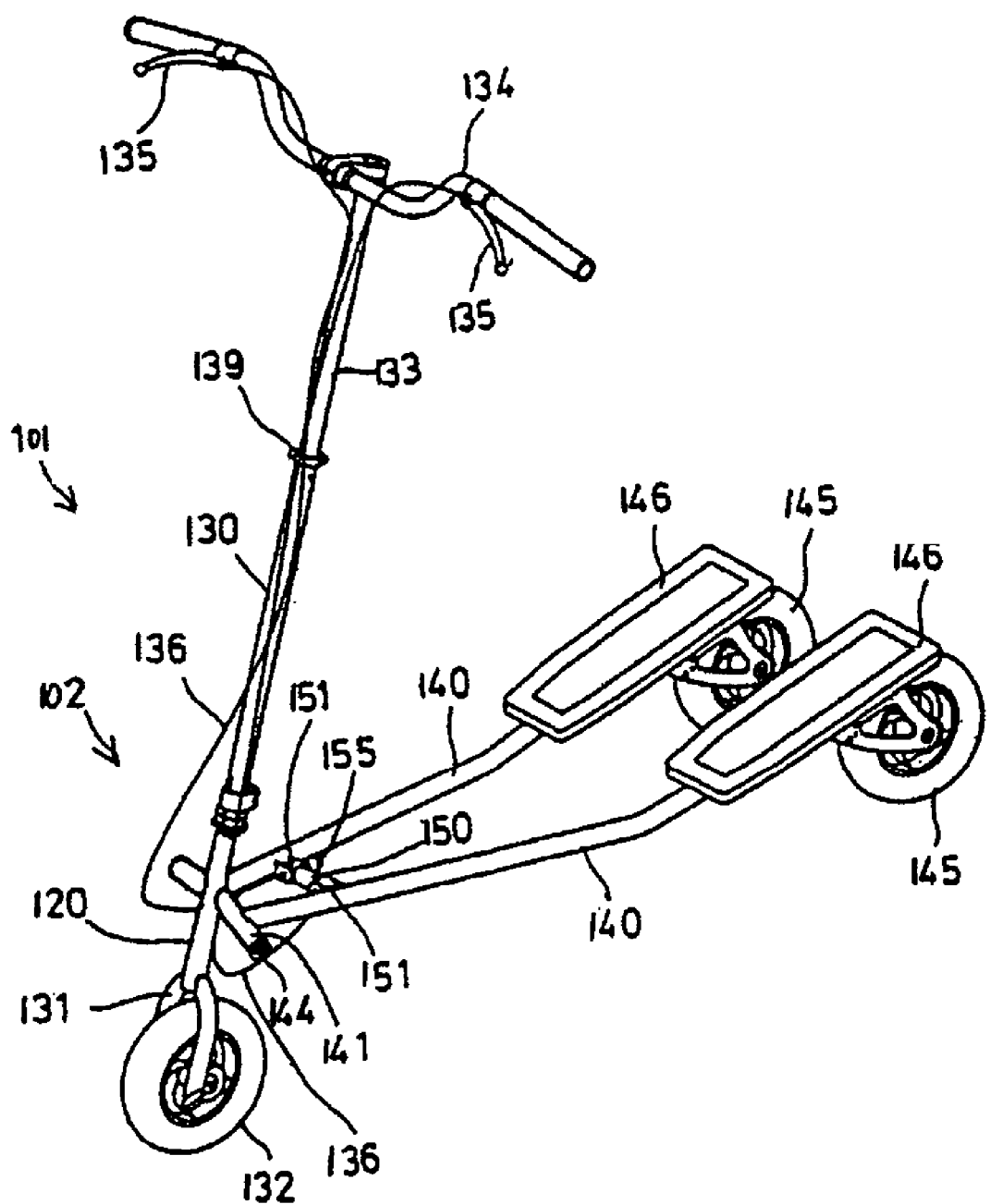
FIG. 2 is a perspective view of the cambering vehicle of FIG. 1.
Figure 3:
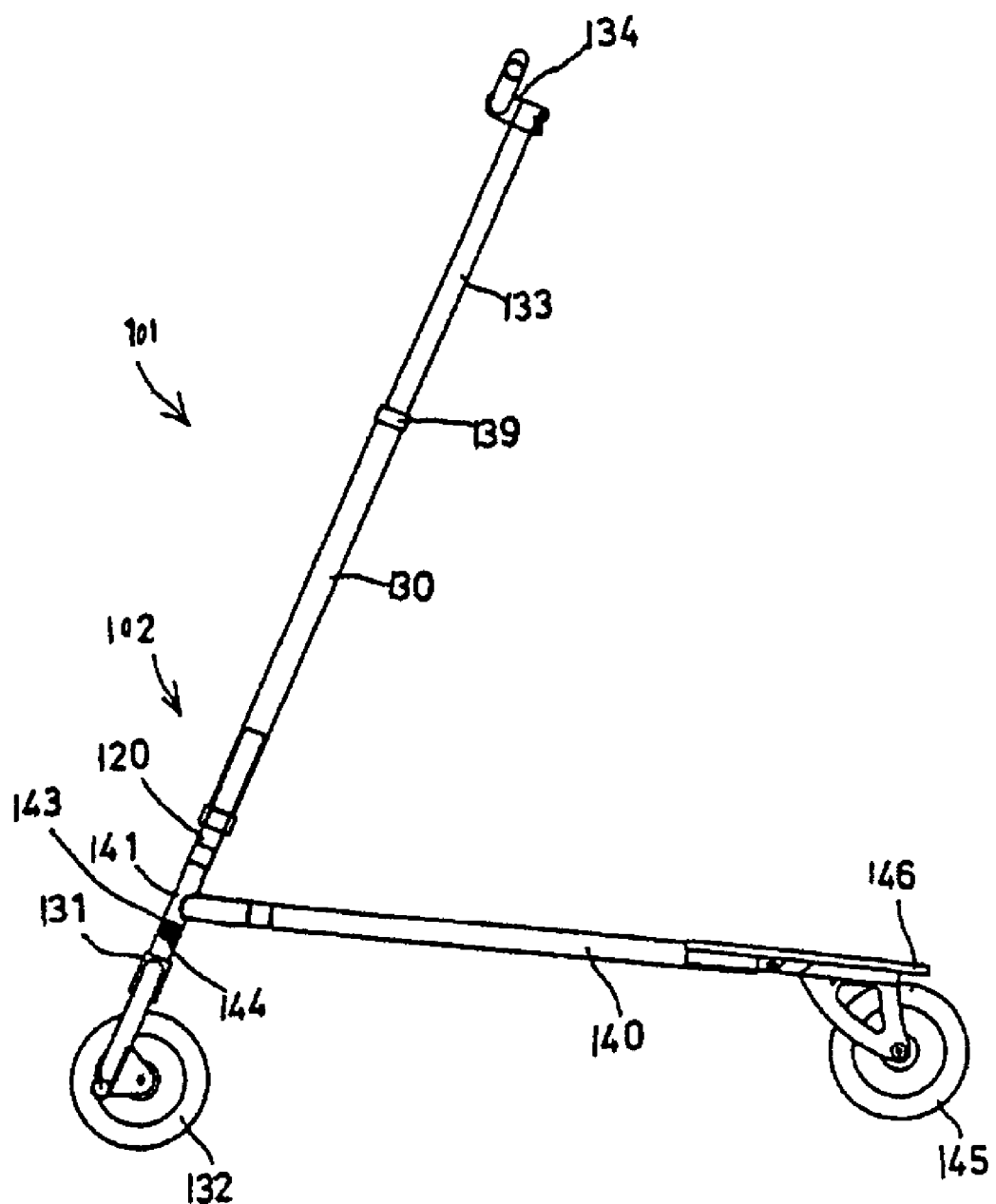
FIG. 3 is a side view of the cambering vehicle of FIG. 1.
Figure 5:
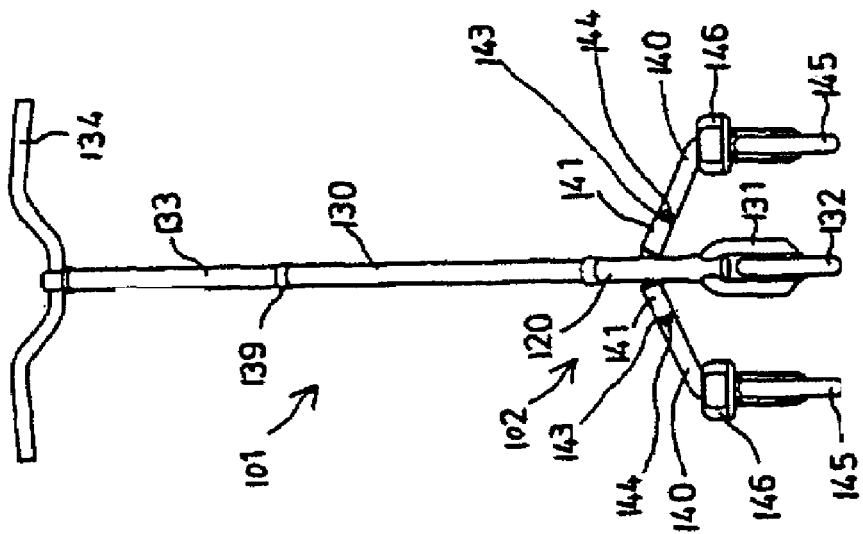
FIG. 5 is a front view of the cambering vehicle of FIG. 1.
Figure 4:
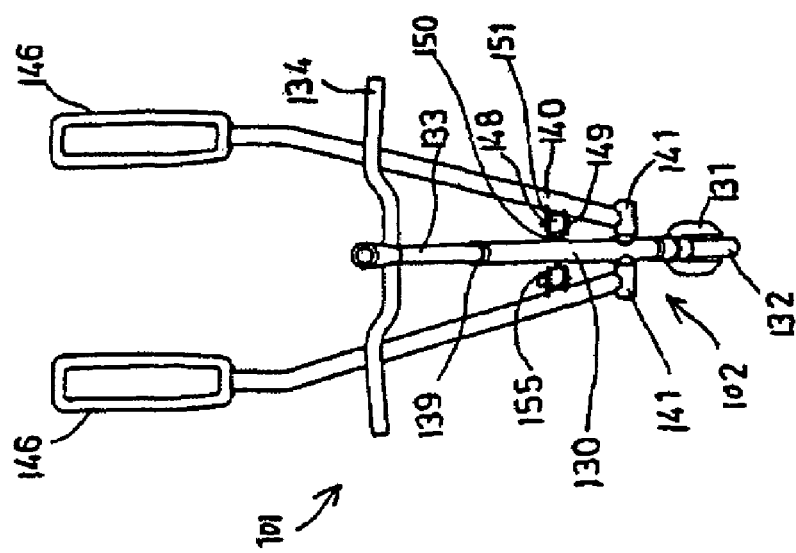
FIG. 4 is a top view of the cambering vehicle of FIG. 1.
Figure 6:
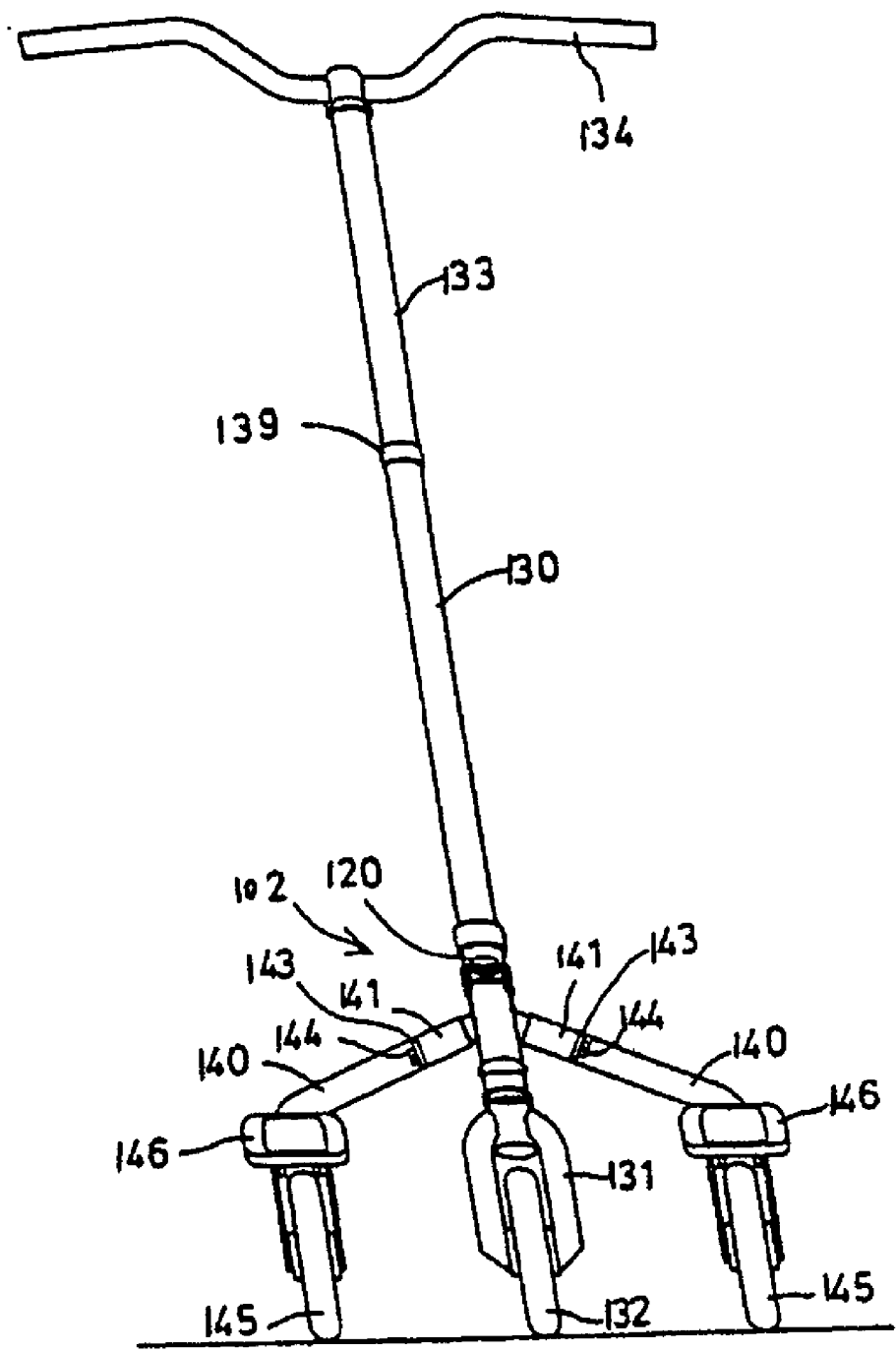
FIG. 6 is a schematic view illustrating the operation of the conventional cambering vehicle of FIG. 1.

In the following are described the preferred embodiments of the ski attachment for a cambering vehicle in accordance with the present invention. In describing the embodiments illustrated in the drawings, specific terminology will be used for the sake of clarity. However, the invention is not intended to be limited to the specific terms so selected, and it is to be understood that each specific term includes all technical equivalents that operate in a similar manner to accomplish a similar purpose. Where like elements have been depicted in multiple embodiments, identical reference numerals have been used in the multiple embodiments for ease of understanding.

Referring to the drawings, and initially to FIGS. 1-5, a conventional cambering vehicle 101 typically comprises a front column 102 including a front tube 120, a steering shaft 130 rotatably engaged or disposed concentrically within the front tube 120, a front fork 131 attached to bottom of the steering shaft 130 to support a front wheel 132, and a handle 134 supported on top of the steering shaft 130.

The steering shaft 130 may further include a stem 133 retractably received therein and extendible outwardly therefrom, or adjustably secured to the steering shaft 130 with various mechanisms, such as a quick release clamp 139. The handle 134 is typically secured on top of the steering shaft 130 or on top of the stem 133 of the steering shaft 130. One or more, for example two, brake hand grips 135 may be attached to the handle 134 for braking purposes, and are typically coupled to cables 136 respectively. As will be discussed, the cables 136 are preferably routed to braking element 147, respectively.

The front column 102 typically includes two pivot axles 121 and 122 extended from the front tube 120, and inclined from the horizontal relative to the front tube 120. For example, as shown in FIG. 1, the pivot axles 121 and 122 are illustrated to extend inclinedly downward relative to the front tube 120. Alternatively, as known in the art, the pivot axles 121 and 122 may extend inclinedly upward relative to the front tube 120.

A left trailing arm and a right trailing arm 140 each include a front portion rotatably or pivotally attached to the front tube 120 of the front column 102 with the pivot axles 121 and 122 respectively. For example, each of the trailing arms 140 includes a bushing 141 attached or provided on the front portion thereof, and rotatably attached onto the pivot axles 121 and 122 respectively, for rotatably or pivotally coupling the trailing arms 140 to the front tube 120 of the front column 102.

The front portions or the bushings 141 of the trailing arms 140 may be rotatably attached to the pivot axles 121 and 122 respectively with bearings 142, washers 143, gaskets or the like, and secured to the pivot axles 121 and 122 with fasteners 144 respectively, in order to solidly or stably couple the trailing arms 140 to the front tube 120 of the front column 102. Each of the trailing arms 140 typically includes a rear wheel 145 rotatably attached to the rear end and a foot pedal 146 disposed thereon to support users.

The conventional cambering vehicle 101 may further include two brake devices 147 attached to the rear portions of the trailing arms 140 respectively, for braking the rear wheels 145 respectively. The brake hand grips 135 are coupled to the brake devices 147 with the cables 136 respectively in order to actuate the brake devices 147 to brake the rear wheels 145.

It is to be noted that the pivot axles 121 and 122 are illustrated or shown to be secured to or extended from the front tube 120 of the front column 102 respectively. However, the pivot axles 121 and 122 may also be provided on the front portions of the trailing arms 140, and rotatably or pivotally attached to the front tube 120 of the front column 102 respectively with such as bushings (not shown) or the like that may be secured or extended inclinedly from the front tube 120 of the front column 102.

Each of the trailing arms 140 may include one or more ears 148 secured thereto or extended therefrom, where the ears 148 of the trailing arms 140 are typically facing toward each other. A cable or a link 150 includes two ends 151 to be pivotally or rotatably secured to the ears 148 of the trailing arms 140 with gaskets or bearings 153 or the like. One end 151 of the link 150 may be rotatably attached to the ears 148 of one of the trailing arms 140 with a pivot pin 149, and the other end 151 of the link 150 may be rotatably and detachably coupled to the ears 148 of the other trailing arm 140 with a fastener (not shown), a latch pin 155 or the like.

Figure 7:
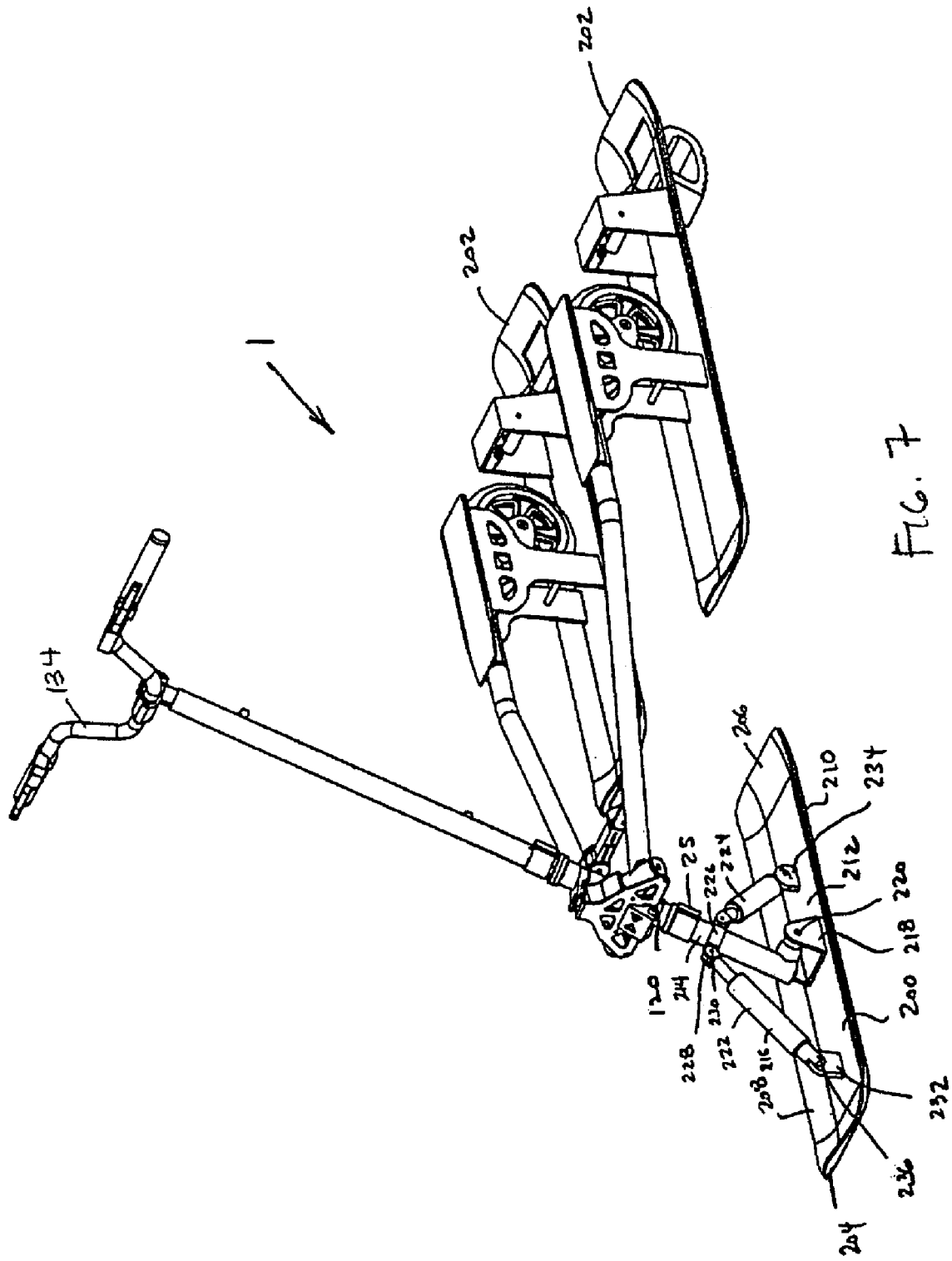
FIG. 7 is a perspective view of a cambering vehicle in accordance with certain aspects of the present invention.

As shown in FIG. 7, a cambering vehicle 1 in accordance with certain aspects of the present invention may be provided with a front ski 200 and a pair of rear skis 202. Each of the skis 200, 202 is typically elongated and may include a flared leading edge 204 and a flared tail edge 206. The skis 200, 202 may also include flared side edges 208, 210 spanning the leading edge 204 and the tail edge 206. The skis may also include a base portion 212 which is non-flared, and relatively flat.

As further shown in FIG. 7, the front ski 200 may attach to the cambering vehicle 1 at the lower portion 125 of the front tube 120. This connection may be by use of a shaft 214 extending from the ski 200 into the front tube 120 in place of the fork 131 of the conventional cambering vehicle 101.

The shaft 214 forms a portion of the suspension system 216 of the front ski 200. The shaft 214 may be connected to the ski 200 by a bracket 218 connected to the base portion 212 of the ski. The connection is typically by a pin 220 to permit the leading edge 204 and the tail edge 206 of the ski 200 to rotate relative to the pin.

So as to dampen or otherwise control the rotation of the ski 200 about the pin 220, the suspension system 216 of the ski 200 may also be provided with one or more dampening devices, such as front shock absorber 222 and rear shock absorber 224.

The shock absorbers 222, 224 may be connected at one of their ends to the shaft 214 by a clamp 226 capable of being clamped around the shaft in a friction fit so as not to move relative thereto. The clamp 226 may include ears 228 to permit connection of the shock absorbers 222, 224. Typically, this connection will be via pins 230, to permit limited rotation of the shock absorbers 222, 224 about the pins 230.

At their opposite ends, the shock absorbers 222, 224 may be connected to the ski 200 via a front support 232 and a rear support 234, provided on the base 212 of the ski. Like the connection at the other end, this connection may be by pins 236, so as to permit limited rotation of the shock absorbers 222, 224 thereabout.

The shock absorbers 222, 224 may be spring loaded, hydraulic, spring loaded and hydraulic, or as otherwise known in industry. Their main purpose is to dampen actuation of the ski 200 about the pin 220 connecting the shaft 214 to the bracket 218.

It will be appreciated that the action of the shock absorbers 222, 224 may be designed such that the leading edge 204 of the ski 200 is generally elevated above the tail edge 206 of the ski when the ski is suspended above the ground. This arrangement serves a plurality of purposes. First, when the cambering vehicle 1 is propelled over a jump, such that at least the front ski 200 is elevated off of the ground, the leading edge 204 of the ski will be properly positioned above the tail edge 206 of the ski for a safe landing. If the front edge 204 of the ski 200 were permitted to fall below the trail edge 206, the operator would run the risk of having the leading edge 204 of the ski 200 impact the earth at such an angle that the cambering vehicle 1 may rotate about the ski 200 such that the rear skis 202 flip up and over the front ski 200, propelling the occupant into a dangerous situation.

Similarly, when the cambering vehicle 1 is being operated on powdery or deep snow, the front ski 200 will remain with its leading edge 204 above the tail edge 206, for proper operation. Similar concerns abound when utilizing the skis 200, 202 on water, such as to make the shock absorbers 222, 224 preferential there as well.

The front ski 200 may be rotated left or right by rotation of the handle 134 just as the front wheel would otherwise be in the conventional cambering vehicle 101. Such rotation will effectuate turning of the cambering vehicle 1, when the vehicle is in motion.

Figure 8:
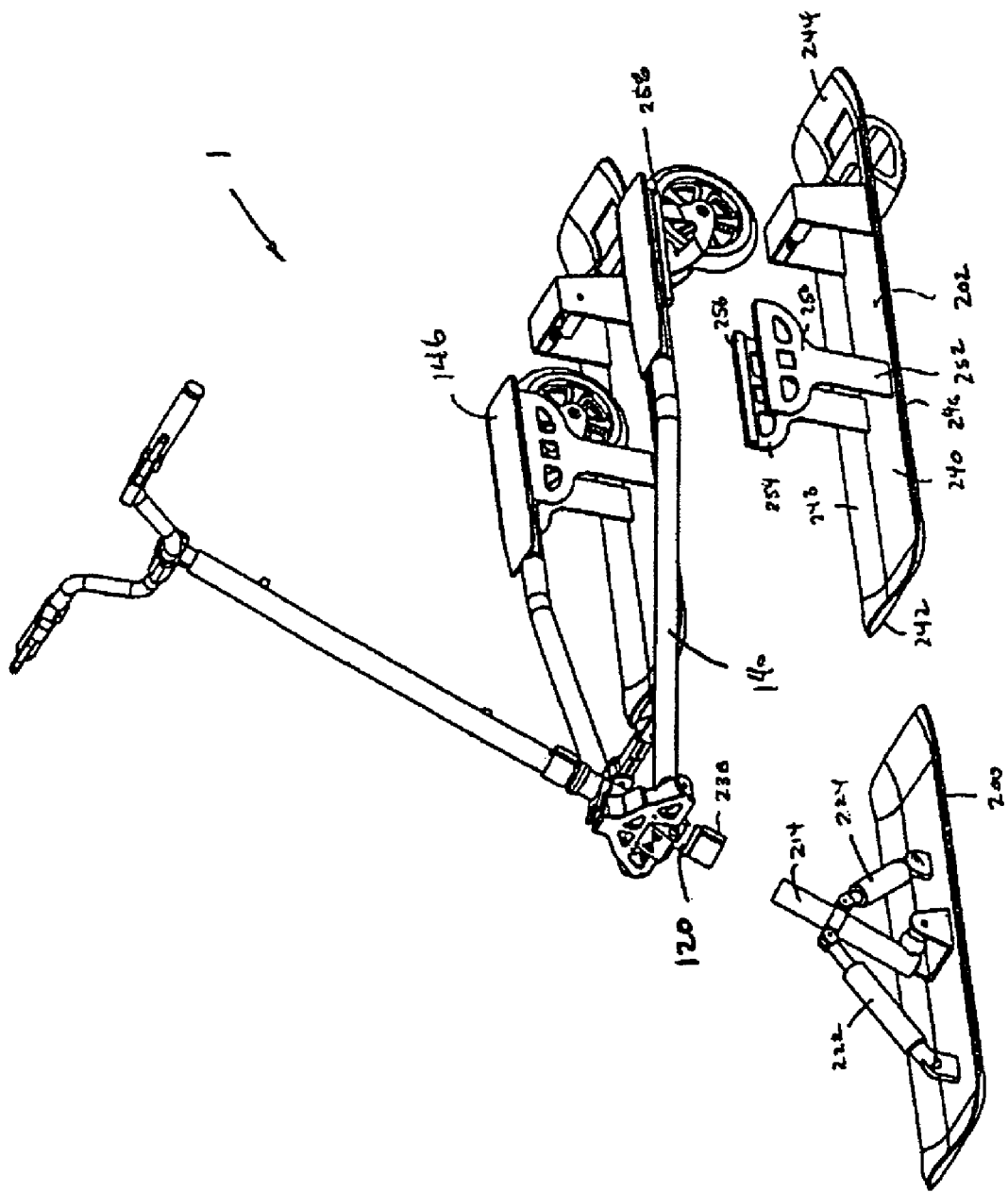
FIG. 8 is a perspective view of the cambering vehicle of FIG. 7 in a partially assembled condition.

FIG. 8 depicts a front ski 200 detached from the front tube 120. Here, it can clearly be seen that the shaft 214 of the ski 200 may be inserted into the front tube 120 to engage the ski to the cambering vehicle 1. In order to affix the shaft 214 within the front tube 120, a clamp 238 may be provided. The clamp 238 may be selectively opened and closed to permit this insertion of release. Clamps suitable for this purpose are well known in the art, and may be provided in conventional cambering vehicle to secure the fork 131.

Also shown in FIG. 8 is a rear ski 202 detached from the left trailing arm 140. As with the front ski 200, the rear ski 202 may include a relatively flat base portion 240 with a flared leading edge 242 and a flared tail edge 244. Each of the side edges 246, 248 may also be flared.

Extending from the base portion 240 of the rear ski may be a pair of support towers 250 adapted to connect the ski 202 to the trailing arm 140 of the cambering vehicle 1. The support towers 250 preferably include an elongate first section 252 connected to the ski 202 and a wider connection portion 254 adapted to be connected to the trailing arm 140.

The connection portions 254 of each support tower 250 may also include a T-shaped appendage 256 extending along the width of the connection portion. The trailing arms 140 may also be provided with channels 258 running along the arms, typically below the foot pedal 146. If so provided, the channel 258 is preferably sized to accept the T-shaped appendage 256 of the connection portion 254 of the tower 250. As such, the T-shaped appendage 256 may be inserted into the channel 258 to connect the ski 202 to trailing arm 140 of the cambering vehicle 1.

Figure 9:
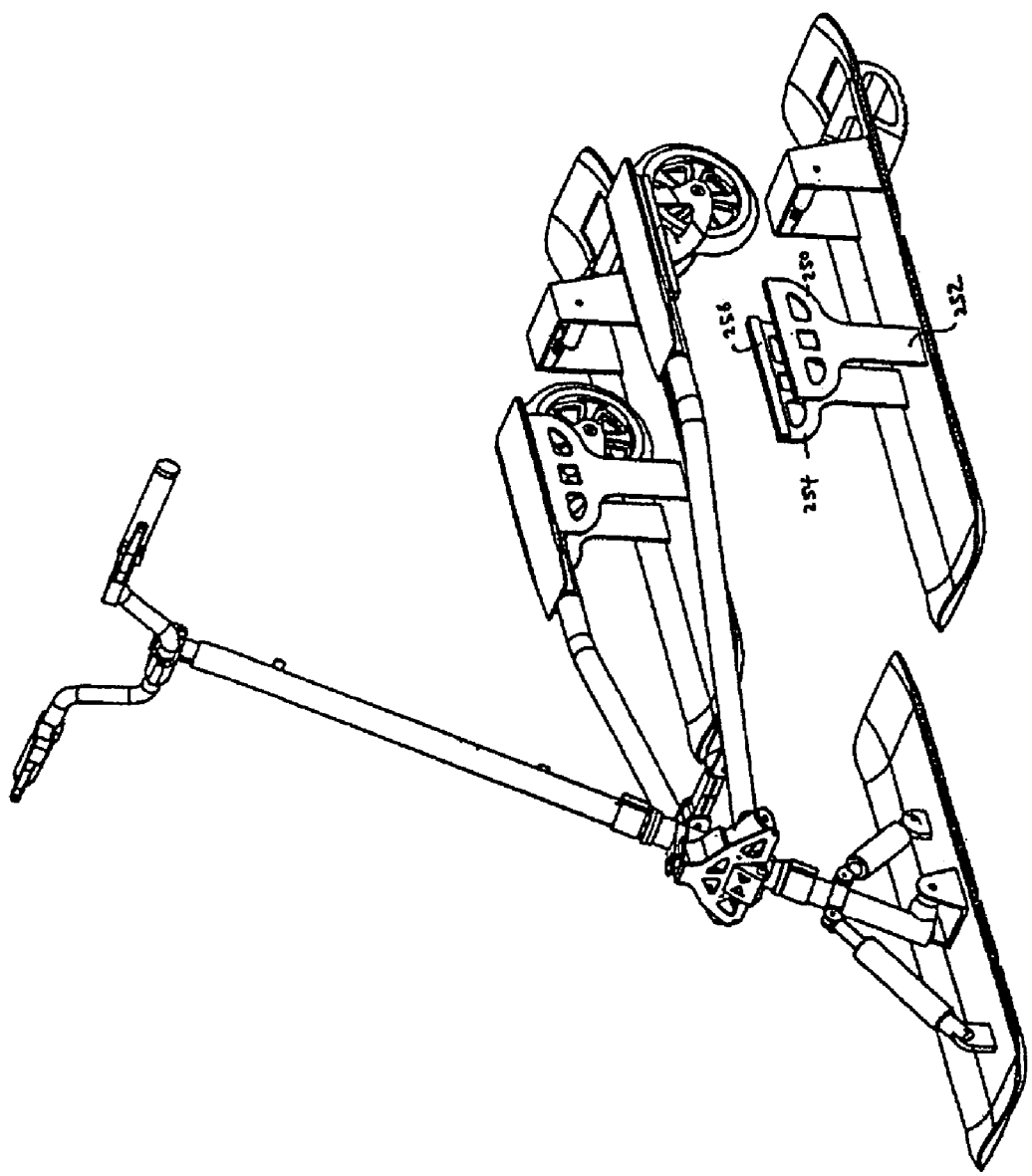
FIG. 9 is a perspective view of the cambering vehicle of FIG. 7 is a more fully assembled condition.
Figure 10:
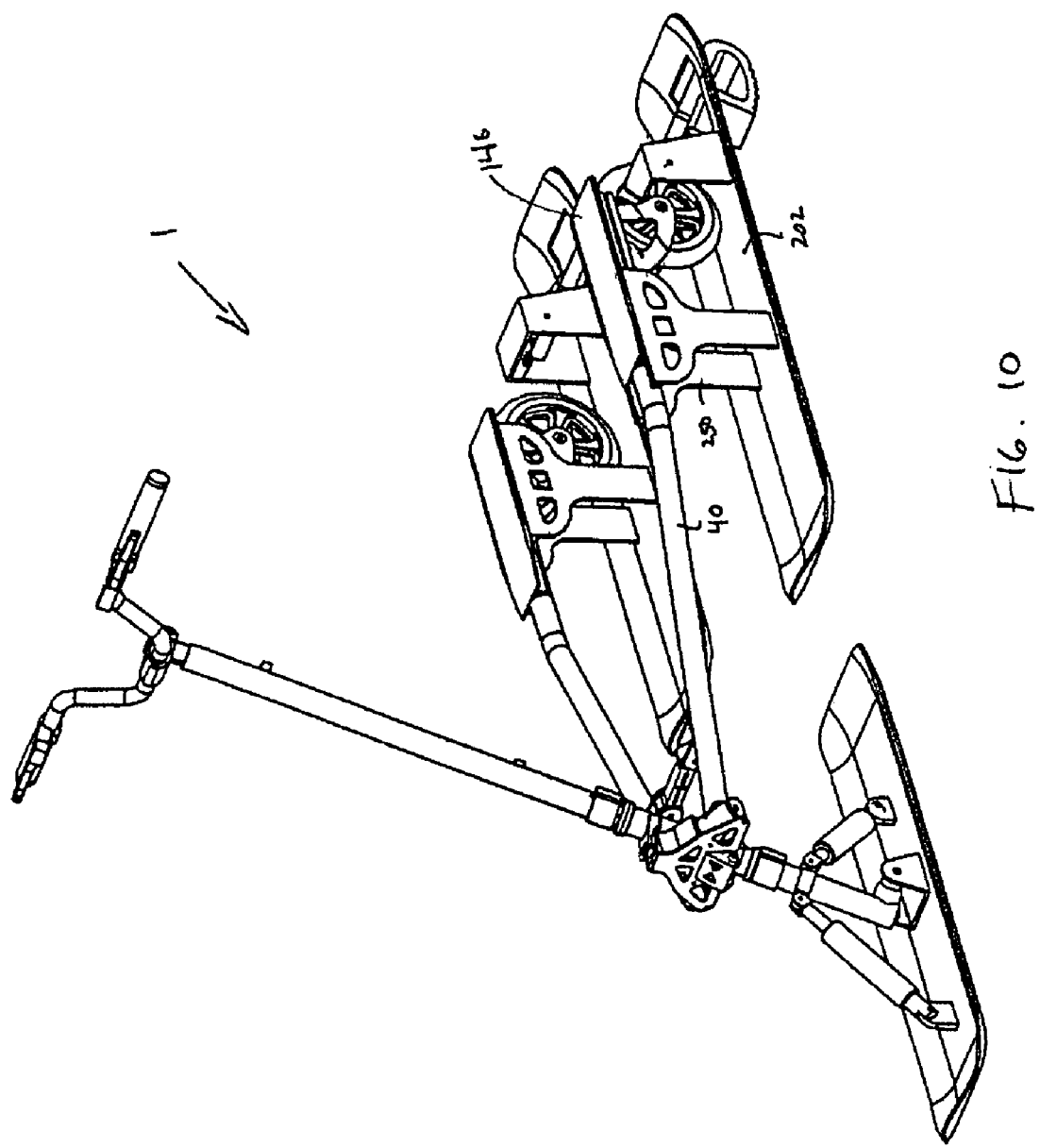
FIG. 10 is a perspective view of the cambering vehicle of FIG. 9 in a more fully assembled condition.
Figure 11:
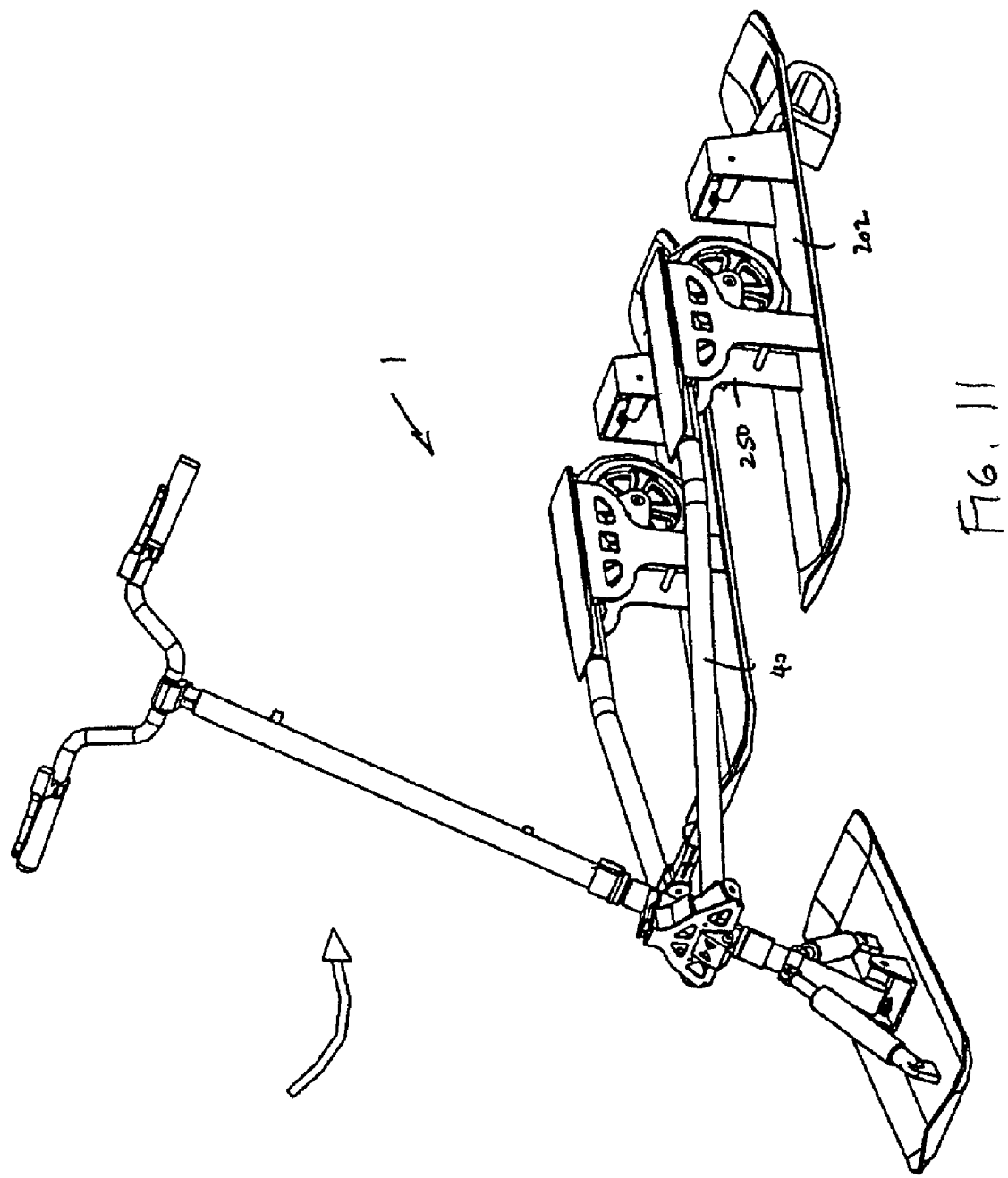
FIG. 11 is a perspective view of the cambering vehicle of FIG. 7 in a fully assembled condition shown with the handlebars turned to the left.

FIG. 9 depicts a cambering vehicle 1 with a completely detached rear ski 202. FIG. 10 depicts an initial stage of the installation of a rear ski 202 onto the cambering vehicle 1 while FIG. 11 depicts the fully installed rear ski. As shown in FIG. 10, it is preferred that the rear ski 202 be installed from the front of the foot pedal 146, nearest the front ski 200. It will be appreciated that forward movement of the vehicle 1 will then tend not to dislodge the ski 202, as it would if the ski were installed from the rear.

Figure 16:
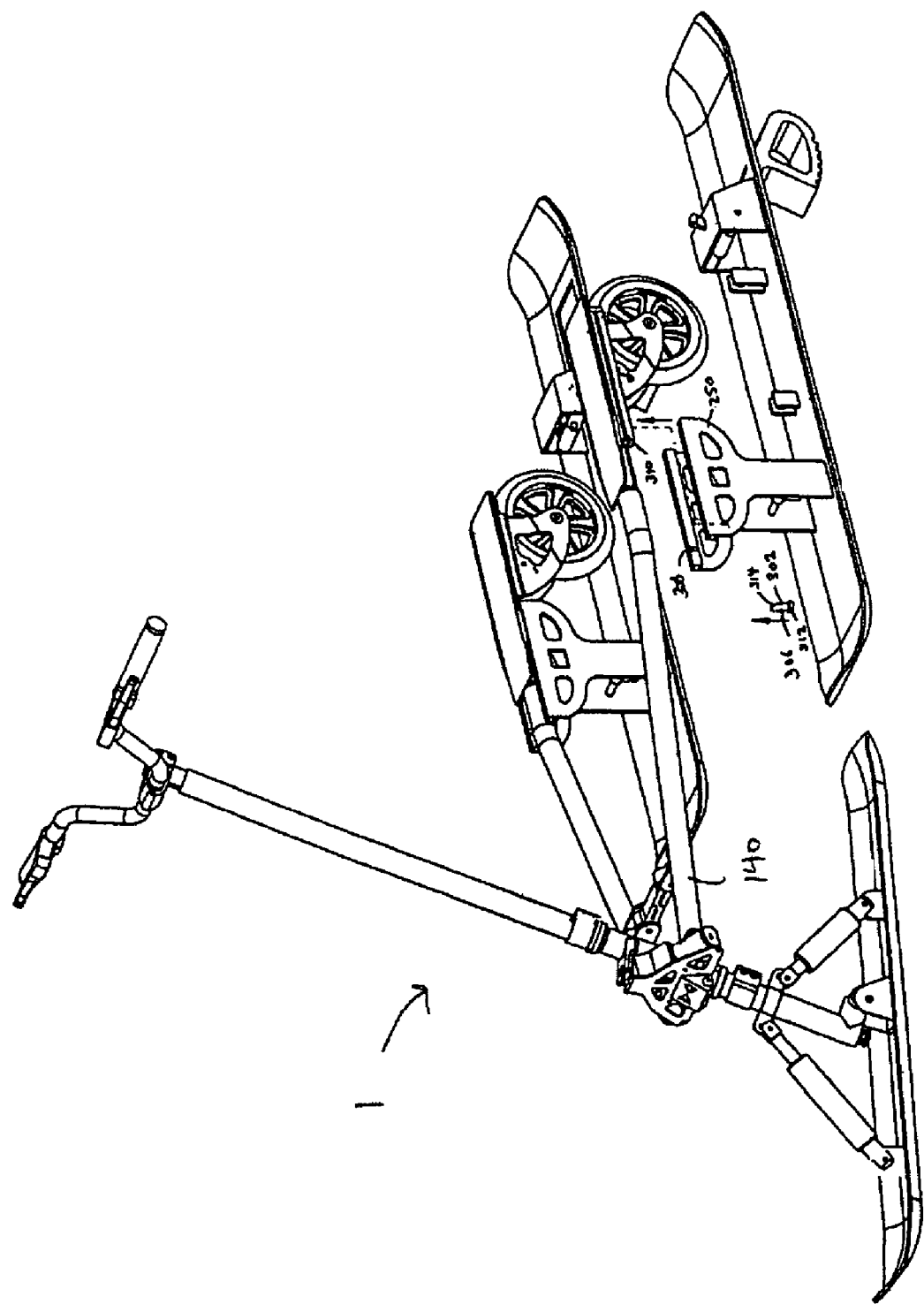
FIG. 16 is a perspective view of the cambering vehicle of FIG. 7 in a partially assembled condition.

FIG. 16 depicts an example of a locking apparatus 302 for locking the ski 202 to the trailing arm 140. A pin 304 having a depressible bearing 306 may be provided. Once the ski 202 is positioned on the trailing arm 140, the pin 302 may be driven through a slot 308 provided in the T-shaped appendage 256 of the connection portion 254 of a support tower 250. The pin 302 may also extend through an aperture 310 provided in the channel 258. It will be appreciated that when the ski 202 is fully installed, the slot 308 and the aperture 310 will align.

Typically, the pin 306 will be inserted far enough to permit the depressible bearing 306 to fully extend through the aperture 310. The pin 302 may be prevented from extending too far into the aperture by its head 312, which is of a greater proportion than its shaft 314. In order to remove the pin 306, the operator must exert a sufficient force to drive the depressible bearing 306 into the shaft 314 during removal. Pins 302 of this type are known in the industry.

Figure 12:
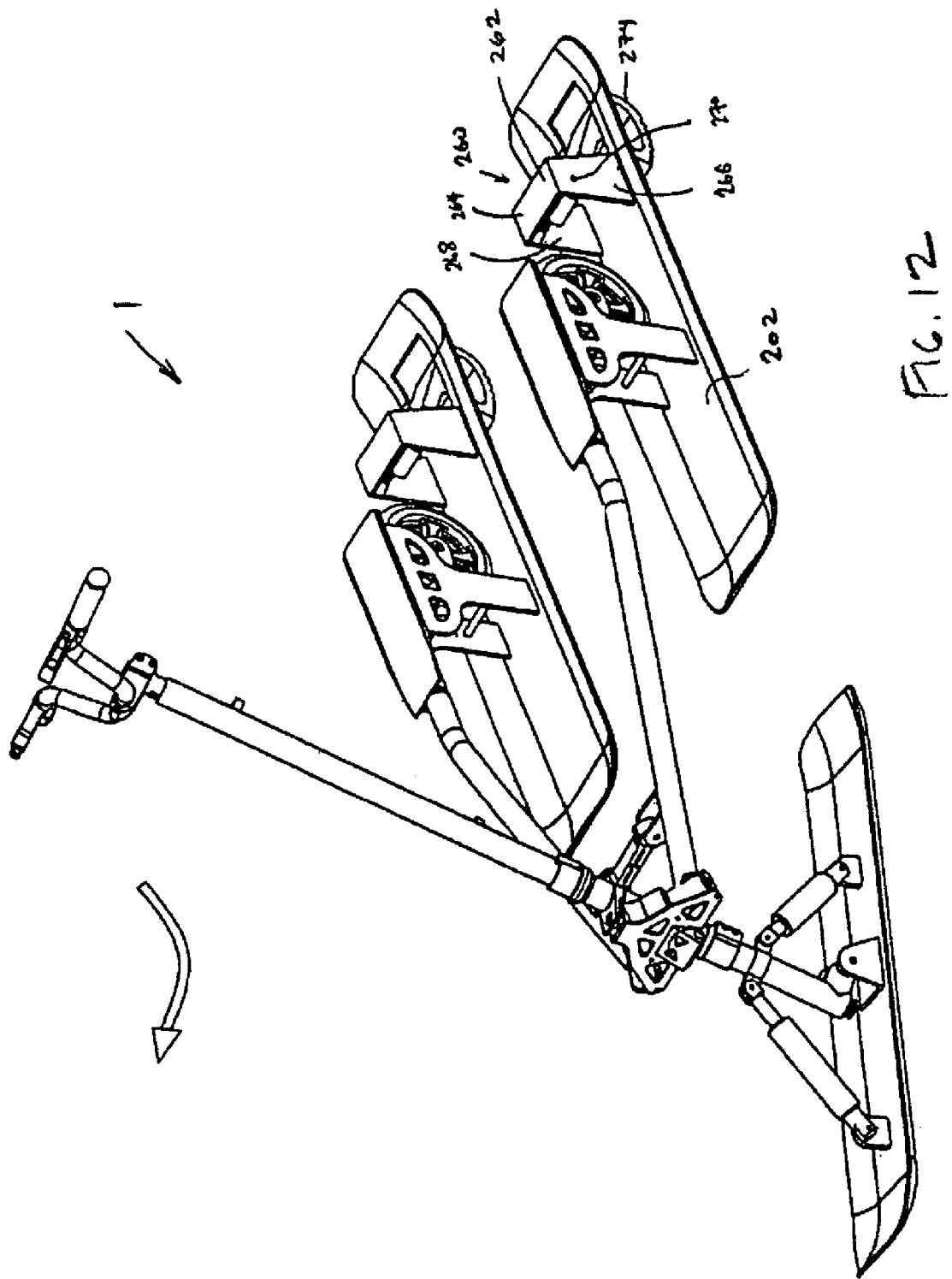
FIG. 12 is a perspective view of the cambering vehicle of FIG. 7 in a fully assembled condition shown with the handle bars turned to the right.

Referring back to FIG. 12, it can be seen that the rear skis 202 may also include a brake mechanism 260. The brake mechanism preferably comprises a support tower 262 having a top 264 spanning two sides 266, 268. Each of the sides may be connected to the base portion 240 of the rear ski 202, toward the tail end 244. The sides 266, 268 may each include apertures 270 through which a pin 272 may be installed. The pin 272 may be utilized to support a brake 274 which may be positioned to extend through an aperture 276 provided in the rear ski 202 while in the brake's active state or may be positioned above the ski while in its passive state.

Figure 13:
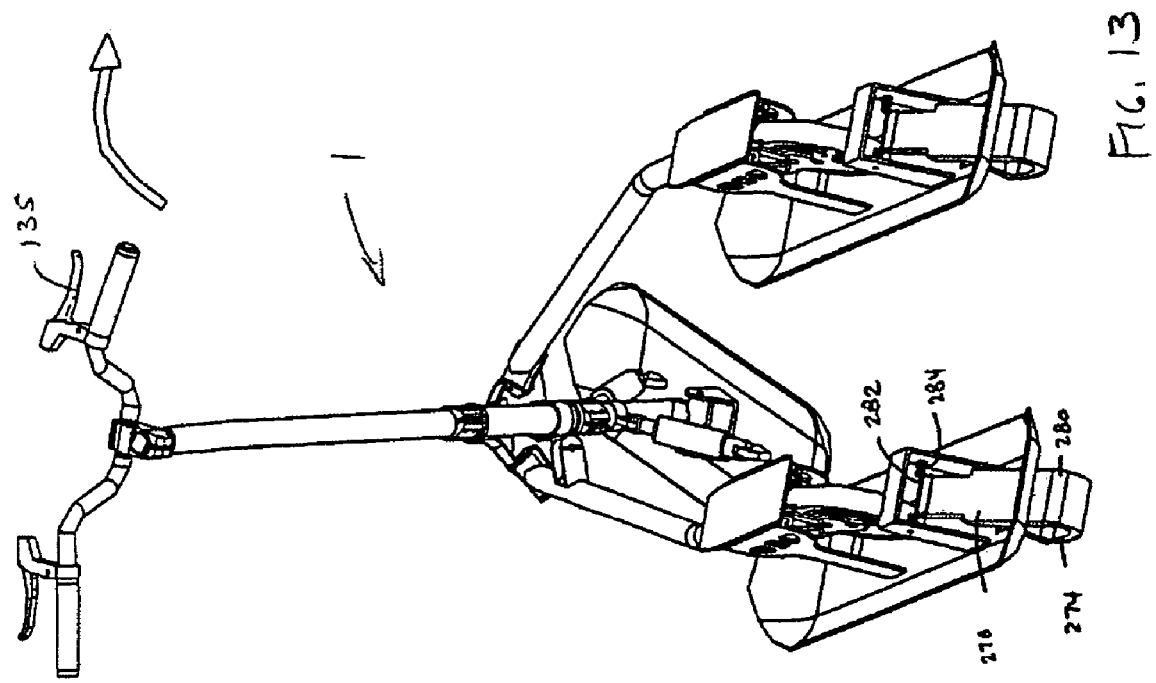
FIG. 13 is a rear perspective view of the cambering vehicle of FIG. 7 in a fully assembled condition shown with the handlebars turned to the right.

Referring to FIG. 13, it is shown that the brake 274 may include a support portion 278 and a heel portion 280. The support portion 278 may include an aperture (not shown) through which a pin 282 may be driven. The pin 282 may also be engaged with the apertures 270 of the two sides 266, 268 of the support tower 264 such that the brake 274 is supported by the support tower 262. This arrangement permits the brake 274 to rotate about the pin 282 such that the heel 280 may be selectively positioned above or below the ski 202. Springs 284 may be provided about the pin 282 to bias the brake 274 into its default position where the heel 280 is below the ski 202.

Preferably, some positive action by the operator will be required to raise the brake 274 above the ski 202 to permit the cambering vehicle 1 to progress forward. As will be described hereinafter, such positive action typically comprises squeezing of the brake hand grips 135. This arrangement ensures that the cambering vehicle 1 will have the brake 274 employed when no activity is being conducted, such as when the cambering vehicle 1 is not being utilized or in the event that the operator becomes disengaged from the vehicle.

Figure 14:
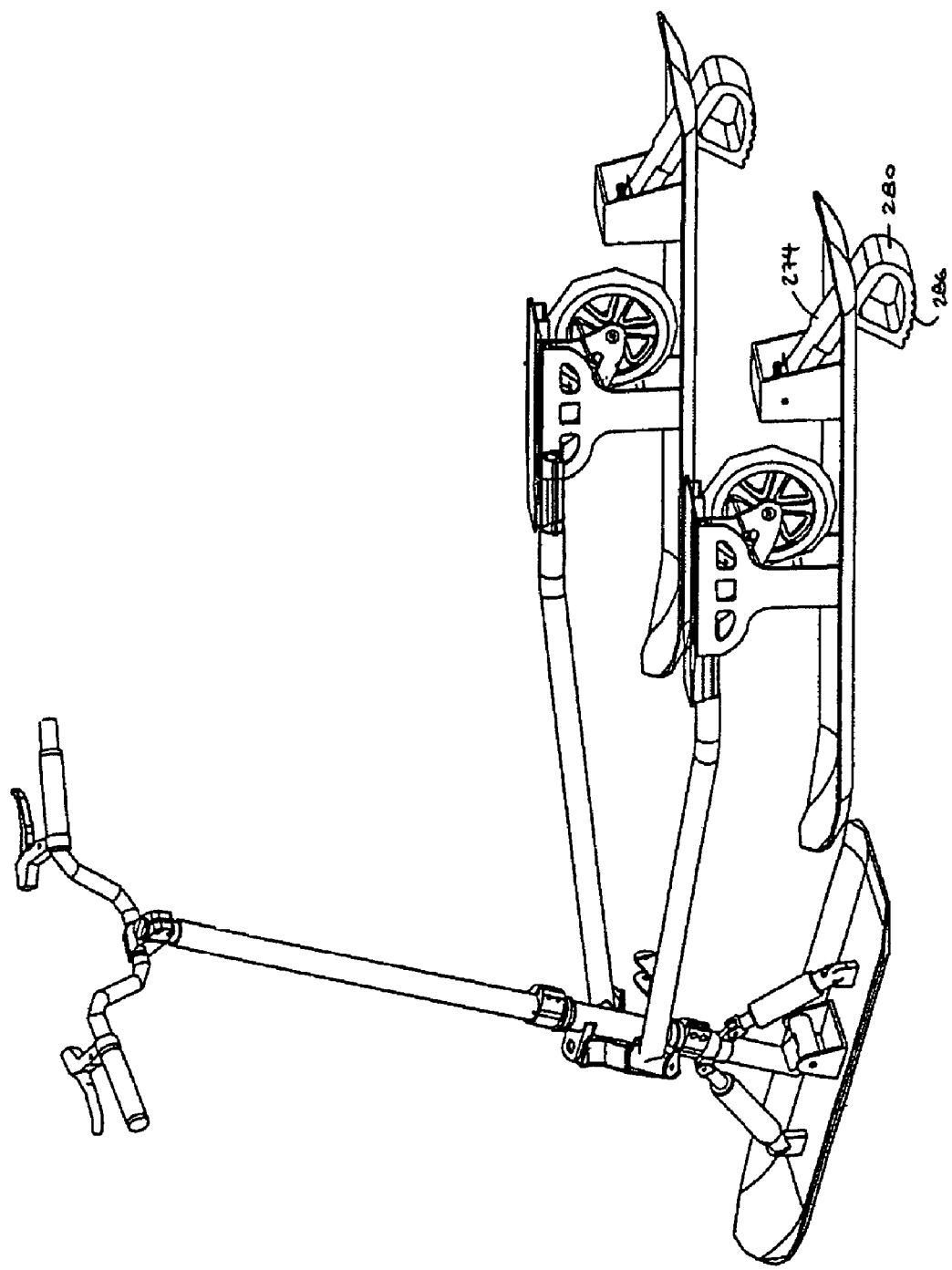
FIG. 14 is a perspective view of the cambering vehicle of FIG. 7 in a fully assembled condition shown with the handlebars turned to the right.

As shown more clearly in FIG. 14, the heel portion 280 of the brake may include surface treatment, such as ridges 286 or other irregularities. Particularly when used on snow or ice, such surface treatment or irregularities are beneficial to raise the level of friction between the snow or ice surface and the brake to grip the snow or ice when the brake 274 is deployed. The heel portion 280 of the brake 274 may also be hollow, as shown in FIG. 14. Hollow heel portions 280 are preferential as the overall weight of the cambering vehicle will be decreased to permit for easier transport. It will be appreciated that the brake mechanism may be deleted on cambering vehicles 1 intended for use only on water.

Figure 15:
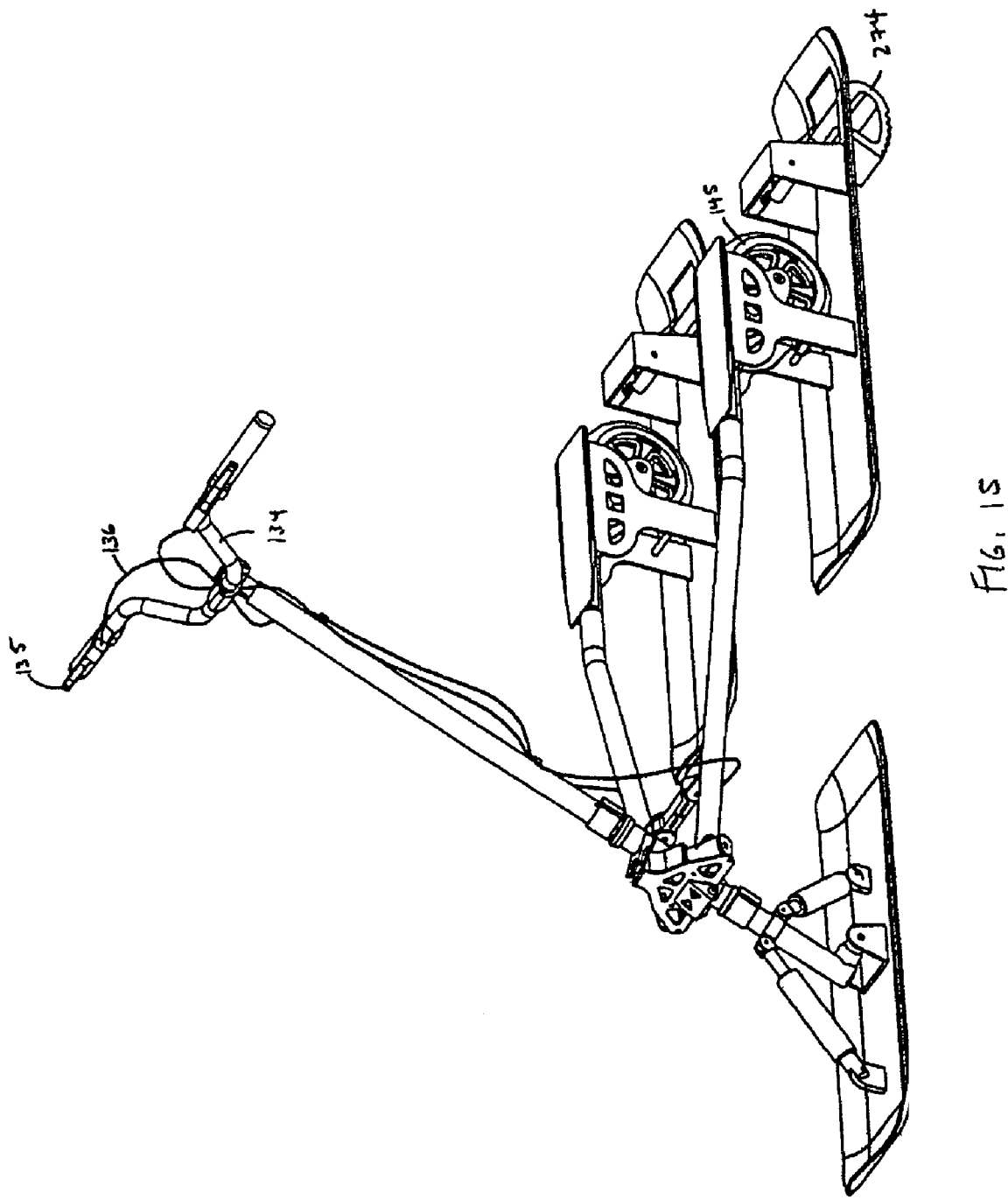
FIG. 15 is a perspective view of the cambering vehicle of FIG. 7 in a fully assembled condition.

FIG. 15 depicts a cambering vehicle 1 with wires 136 extending from the brake hand grips 135. The wires 136 are the same that are utilized to engage the braking element 147 of the wheels 145 in the conventional cambering vehicle 101, as previously discussed. In some embodiments, the wires 136 may be completely replaced with new wires (not shown) that connect the brake hand grips 135 directly to the brake 274. If so provided, the brakes 274 will preferably be raised when the hand grips 135 are squeezed, such as when the hand grips are moved close to the handle 134.

Figure 17:
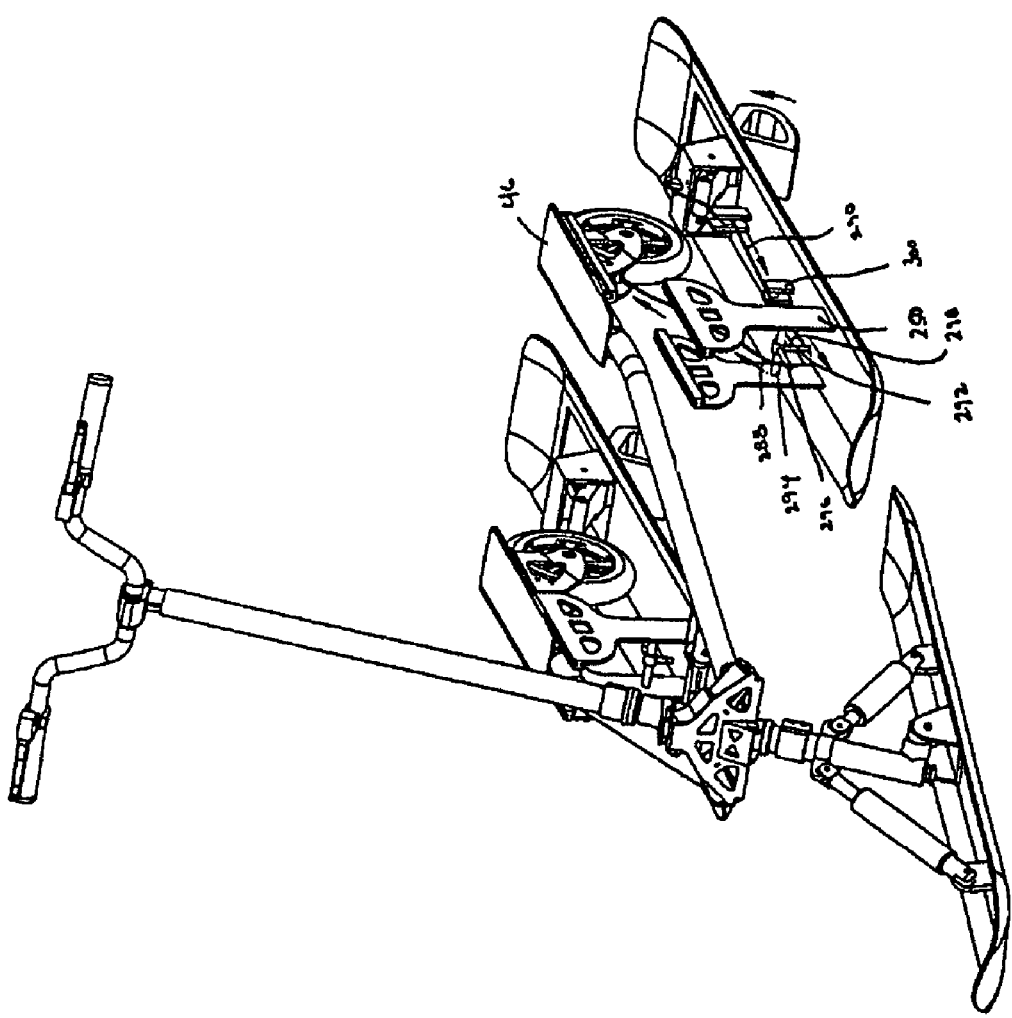
FIG. 17 is a perspective view of the cambering vehicle of FIG. 7 in a partially assembled condition.

Preferably, however, the wires 136 remain in place and are utilized to employ both the braking element 147 of the wheels 145 and the brake 274 of the ski 202 simultaneously. FIG. 17 depicts one arrangement for achieving this dual purpose. In this arrangement, a second wire 288 and a third wire 290 are provided. The third wire 290 may be provided pre-assembled with the ski 202. Generally, the third wire 290 may travel from the support portion 278 of the brake 274 to an energy transfer mechanism 292 spanning the support towers 250 of the ski 202. The energy transfer mechanism 292 may comprise a shaft 294 spanning the support towers 250 from which first and second extension members 296, 298 may radiate. The third wire 290 may connect to the second extension member 298 and may be supported by numerous bridges 300 en-route to the brake 274.

Once the ski 202 is installed upon the cambering vehicle 202 as previously described, the second wire may be connected to the first extension member 296 of the energy transfer mechanism 292 and the braking element 147. Once installed, squeezing of the brake hand grip 135 will rotate the braking element 147. This rotation causes the second wire 288 to become taught to pull on the second extension member 296, thus rotating the energy transfer mechanism 292 about shaft 294. Such rotation causes the second extension member 298 to rotate, thus causing the third wire 290 to become taught. The third wire 290 then pulls on the brake 274 to raise the heel 280 above the ski 202. This position is the preferable braking position when the cambering vehicle 1 is being utilized. When the brake hand grips 135 are released, the springs 284 will automatically return the heel 280 of the brake 274 to its default position below the level of the ski 202, to stop the cambering vehicle 1.

In operation, the embodiments of the cambering vehicle 1 employing the skis 200, 202 operate in a similar manner as other embodiments of the cambering vehicle designed to be used on dry land. For example, an operator may still stand upon the foot pedals 146 of the trailing arms 140 when the cambering vehicle 1 is in motion. Also, the handle 134 may be rotated to turn the vehicle 1. Such rotation of the handle 134 causes the front ski 200 to rotate, as previously discussed. Repeated rotation of the handle 134 left and right causes serpentine, or cambering, motion of the vehicle 1 as it travels downhill. It will be appreciated that such movement is not necessary to propel the vehicle 1 if operated on a sufficient incline. Rather, in this circumstance, such movement permits the operator to maintain a steady speed as he maneuvers down an incline, as each turning motion will reduce the overall vehicle speed, much like a downhill skier reduce overall speed by carving repeated turns.

The ability to slow is also managed by the brake 274. As discussed, the brake's default position 274 is typically with its heel 280 below the rear ski 202. This causes the vehicle 1 to stop. In order to operate the vehicle in certain embodiments, the operator may squeeze the brake hand grips 135 to raise the level of the brake 274. If the operator chooses, he may initiate varying degrees of brake force by engaging the brake hand grips 135 in varying degrees. For example, partial release of the hand grips 135 will permit the brake 274 to partially engage the surface upon which the vehicle is traveling.

In accordance with other aspects of the cambering vehicle of the present invention, the cambering vehicle 1 may further comprise a second folding mechanism adapted to fold the trailing arms 40 into at least two sections. Such a mechanism 400 is shown generally in FIGS. 18A-18C and 19A-19B. This folding mechanism 400 may be used in conjunction with other folding mechanism, or may be used without other folding mechanisms.

As shown in FIG. 19C, the folding mechanism 400 may comprise a first support 402 and a second support 404. The first support 402 may form a portion of the ears 148 utilized to secure the link 150 to the trailing arm 140 of the cambering vehicle 1. The second support 404 may be attached to, or form a portion of, the remainder of the trailing arm 40, as shown in FIG. 19C. A pin 406 may be provided to connect the first support 402 to the second support 404. The first support 402 may be fixed relative to the ears 48 while the second support 404 is free to rotate about the pin 406. Such rotation may be prevented by various locking mechanisms.

Figure 20C:
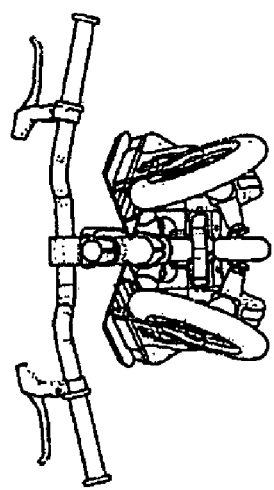
FIG. 20C depicts a rear view of the cambering vehicle of FIG. 18A in a folded condition.
Figure 20A:
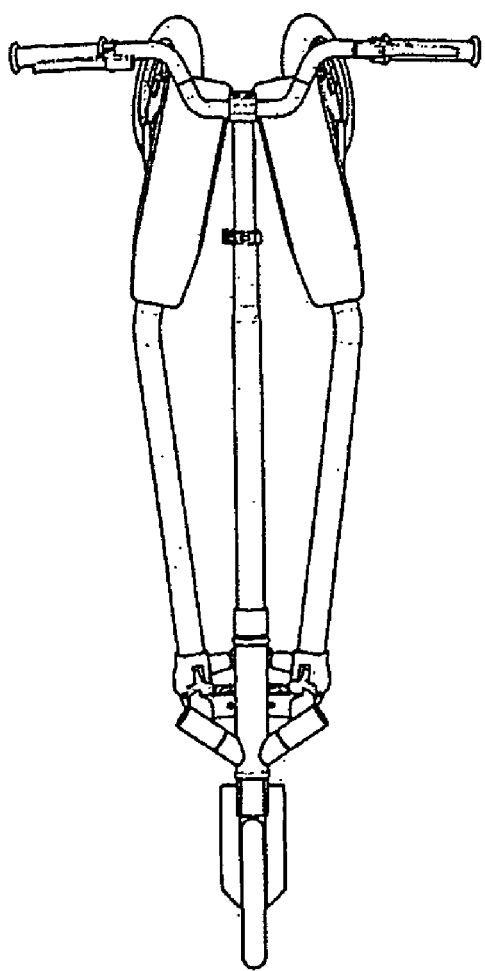
FIG. 20A depicts a top view of the cambering vehicle of FIG. 18A in a folded condition.
Figure 20B:
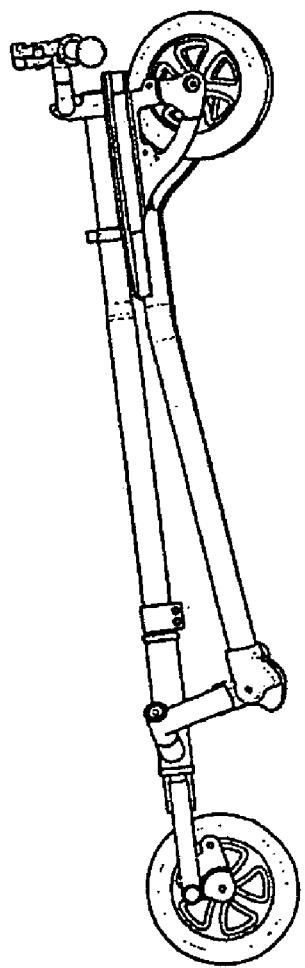
FIG. 20B depicts a side view of the cambering vehicle of FIG. 18A in a folded condition.

In the locking mechanism depicted in FIG. 19C, a tension pin 408 may extend from one side of the second support 404 through a cone shaped tension pin housing 410. The tension pin 408 may be partially withdrawn from within the housing 410 to permit a lever 412 to be depressed. Once the lever 412 is depressed, the second support 404 may freely rotate about the pin 406. Thus, to fold the cambering vehicle 1, the user must pull the tension pin 408 partially out from within the housing 410 while simultaneously depressing the lever 412. It will be appreciated that the tension pin 408 may be spring loaded within the housing such that a sufficient amount of force is required to partially withdraw the pin 408 from the housing 410, to prevent accidental withdrawal. Also, the tension pin 408 may include components which inhibit the pin from being completely withdrawn from the housing 410, so it is not lost. A cambering vehicle 1 in accordance with this embodiment shown in a folded condition is depicted in FIGS. 20A-20C.

In order to unfold the cambering vehicle 1, it will be appreciated that the user again may have to partially withdraw the pin 408 from within the housing. Unlike the procedure for folding the cambering vehicle 1, however, unfolding the vehicle may not require depressing of the lever 412. Rather, the lever 412 may be constructed such that it will automatically permit the trailing arm 140 and the second support 404 to rotate into position, where the lever will become locked, such that it must be depressed to permit the trailing arm and the second support to fold.

In other embodiments, the folding mechanism 400 may be utilized with skis 200, 202. Such skis 200, 202 may be similar to those employed in conjunction with wheels 145 (FIG. 8), or may be utilized with cambering vehicles 1 that are specifically made for use with skis 200, 200, and which do not include wheels. Such vehicles may be suitable for use on snow, ice or water.

One such vehicle is depicted in FIGS. 21A-21C. In this embodiment, the cambering vehicle 1 only employs skis 200, 202, and does not include wheels. Alternately, the cambering vehicle 1 may employ removable wheels which can be selectively exchanged for ski attachments, depending on the use the user is putting the vehicle to.

Figure 22A:
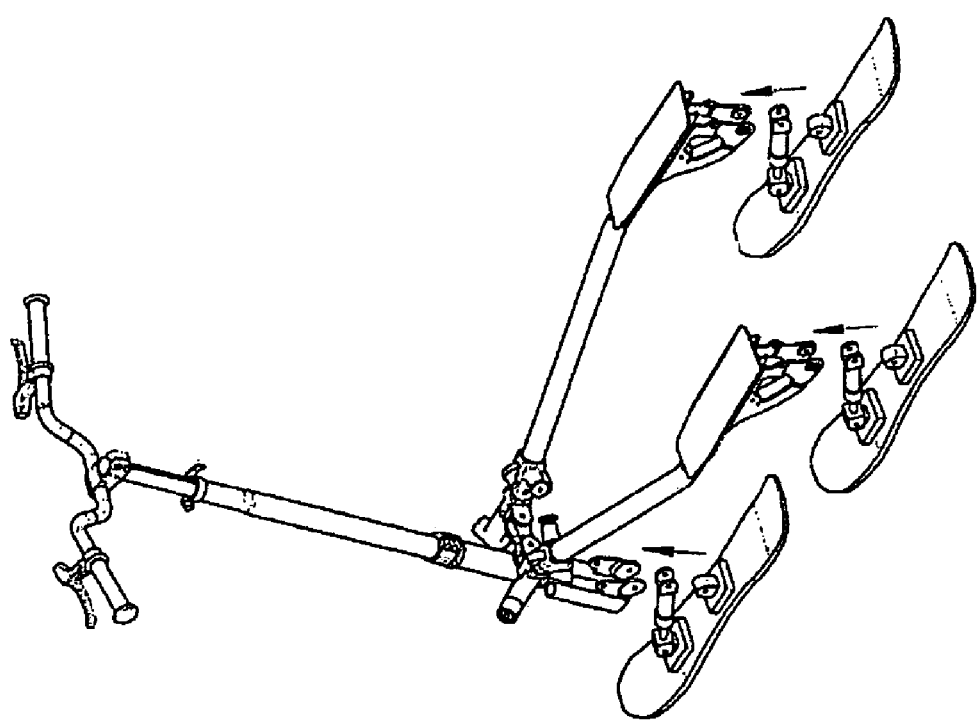
FIG. 22A depicts the cambering vehicle of FIG. 21A in a partially assembled condition.

The skis of this embodiment may also include shock absorbers, similar to those employed in other embodiments of the cambering vehicle. FIG. 22A depicts a method of installing the skis in accordance with this embodiment. As is shown, the ski attachments may simply replace the wheels below the level of the foot pedals.

Figure 23A:
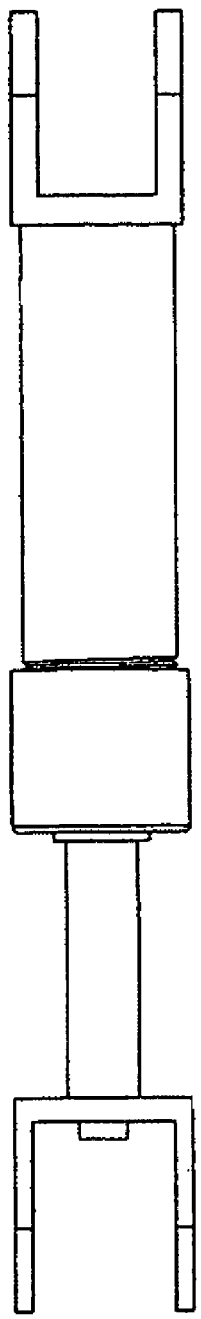
FIG. 23A depicts a perspective view of a component forming a portion of the suspension system utilized in embodiments of the cambering vehicle of the present invention.
Figure 23B:
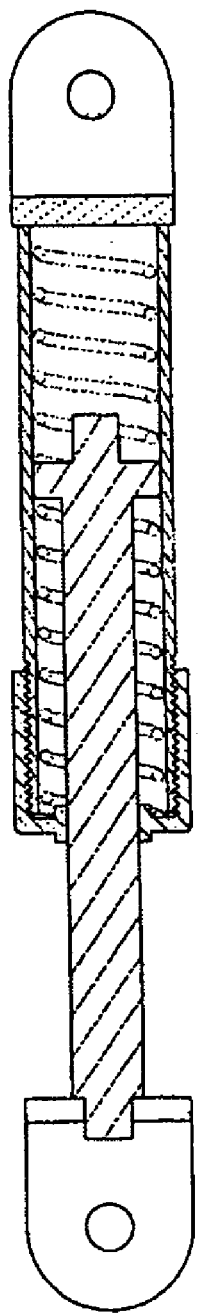
FIG. 23B depicts a cross-sectional view of the component of FIG. 23A.

FIGS. 23A and 23B depict an example of a shock absorber 222, 224 which may be utilized in various embodiments of the cambering vehicle 1. The shock absorber 222, 224 may include internal springs which dampen movement of a rod, as shown in FIG. 23B. Alternatively, the shock absorbers 222, 224 may incorporate hydraulic fluids. Such shock absorbers are well known in the art.

Figure 24:
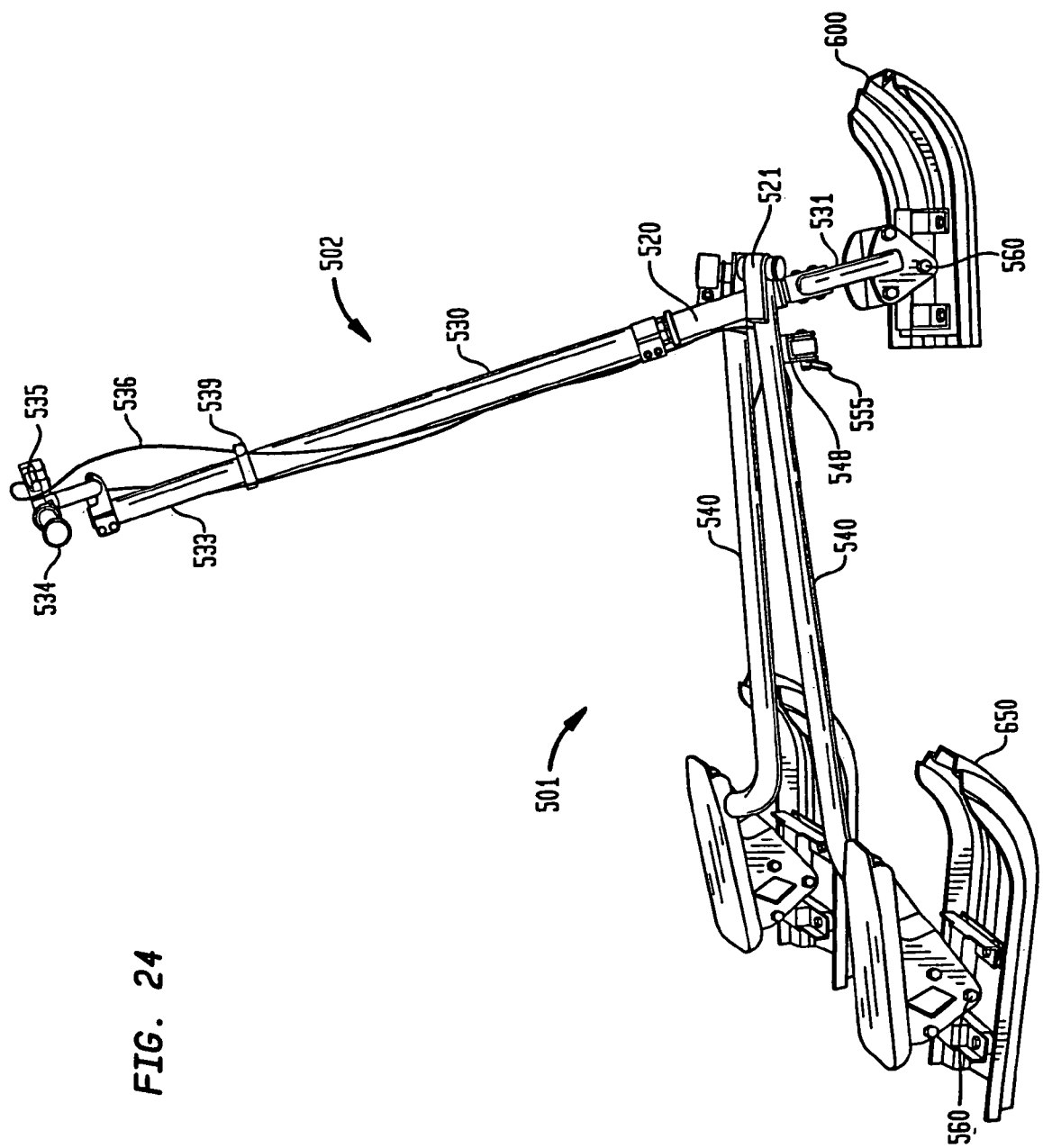
FIG. 24 depicts a perspective view of a cambering vehicle in accordance with further aspects of the present invention.

Referring to FIGS. 24-28, and particularly FIG. 24, a cambering vehicle 501 in accordance with a most preferred embodiment of the present invention may comprise a front column 502 including a front tube 520, a steering shaft 530 rotatably engaged or disposed concentrically within the front tube 520, a front fork 531 attached to bottom of the steering shaft 530 to support a front ski 600, and a handle 534 supported on top of the steering shaft 530.

The steering shaft 530 may further include a stem 533 retractably received therein and extendible outwardly therefrom, or adjustably secured to the steering shaft 530 with various mechanisms, such as a quick release clamp 539. The handle 534 may be secured on top of the steering shaft 530 or on top of the stem 533 of the steering shaft 530. One or more, for example two, brake hand grips 535 may be attached to the handle 534 for braking purposes, and are coupled to cables 536 respectively. As will be discussed, and as discussed with respect to previous embodiments, the cables 536 are preferably routed to braking elements 547, respectively.

Figure 25:
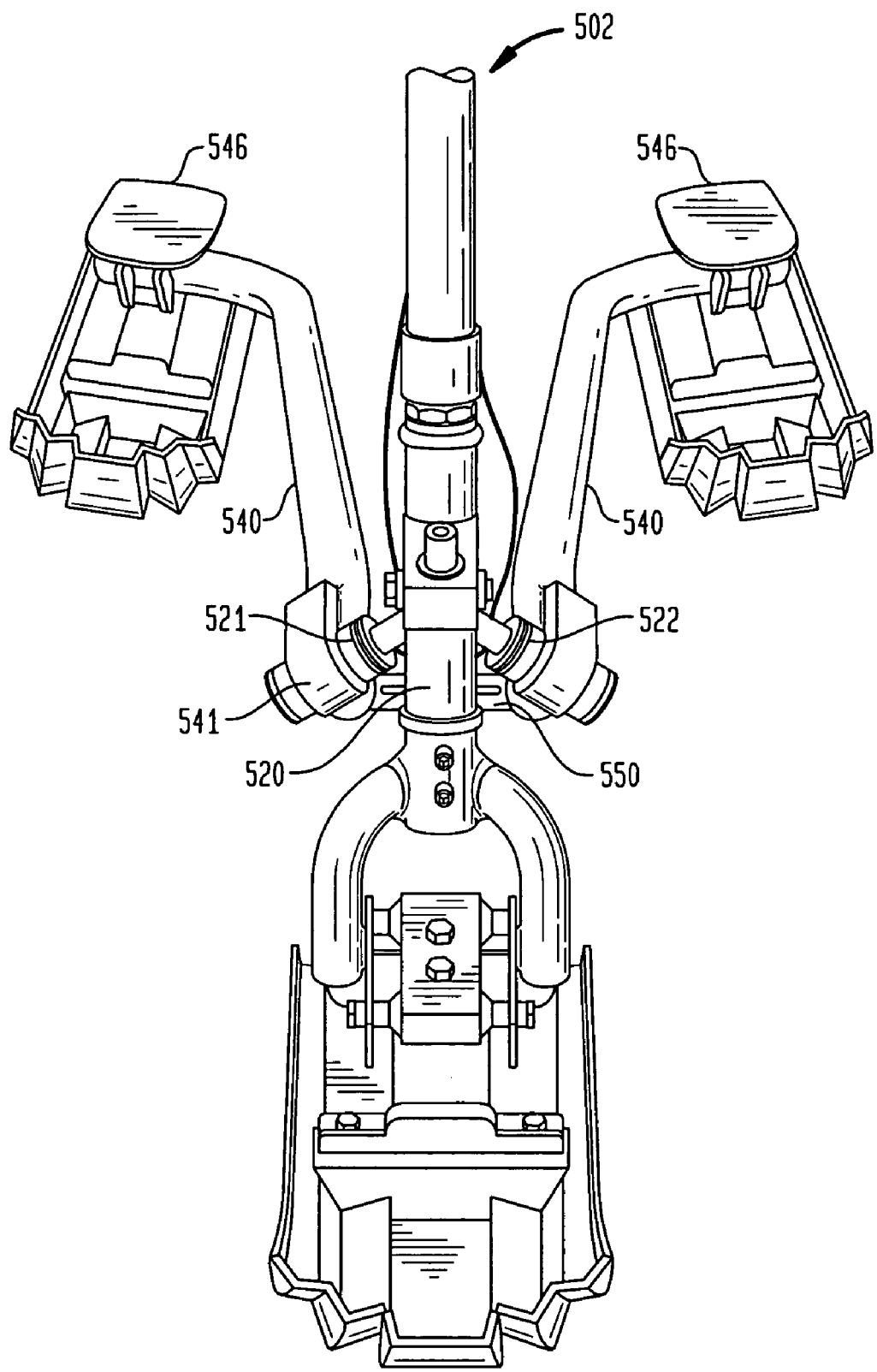
FIG. 25 depicts a frontal view of the cambering vehicle of FIG. 24.

As shown in FIG. 25, the front column 502 may include two pivot axles 521 and 522 extended from the front tube 520, and inclined from the horizontal relative to the front tube 520. For example, as shown in FIG. 25, the pivot axles 521 and 522 are illustrated to be extended inclinedly downward relative to the front tube 520. However, the pivot axles 521 and 522 may also be extended inclinedly upward relative to the front tube 520, in other embodiments.

A left trailing arm and a right trailing arm 540 may each include a front portion 541 rotatably or pivotally attached to the front tube 520 of the front column 502 by the pivot axles 521 and 522 respectively.

The front portions 541 of the trailing arms 540 may be rotatably attached to the pivot axles 521 and 522 respectively with bearings, washers, gaskets or the like, and secured to the pivot axles 121 and 122 with fasteners, in order to solidly or stably couple the trailing arms 540 to the front tube 520 of the front column 502. Each of the trailing arms 540 includes a foot pedal 546 disposed thereon to support users.

Each of the trailing arms 540 may include one or more ears 548 secured thereto or extended therefrom. In the embodiment shown in FIG. 24, the ears 548 are each facing downward. A cable or a link 550 includes two ends 551 to be pivotally or rotatably secured to the ears 548 of the trailing arms 540 with gaskets or bearings or the like. One end 551 of the link 550 may be rotatably attached to the ears 548 of one of the trailing arms 540 with a pivot pin, and the other end 551 of the link 550 may be rotatably and detachably coupled to the ears 548 of the other trailing arm 540 with a fastener (not shown), a latch pin 555 or the like.

As shown in FIG. 24, the cambering vehicle 501 may include skis, such as a front ski 600 connected to the front tube 520, and rear skis 650, connected to the two trailing arms 540. It will be appreciated that each of the skis, 600, 650, may replace wheels (not shown), which may also be utilized wit the cambering vehicle 501 depicted in FIG. 24. In this regard, the cambering vehicle 501 may include axles 560 on both the fork 531 and the trailing arms 540, upon which the wheels (not shown) or skis 600, 650 may mount.

Figure 26:
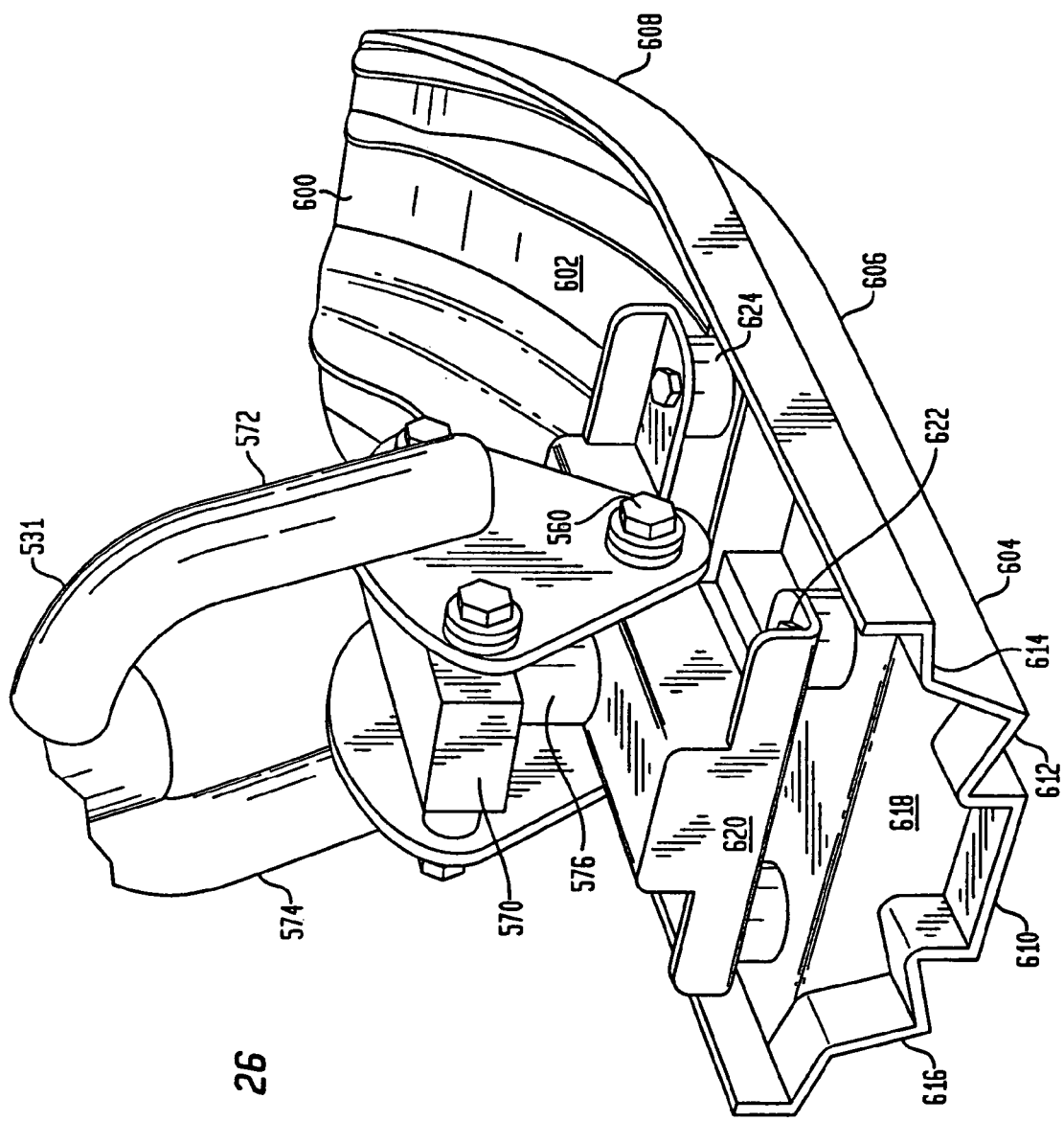
FIG. 26 depicts a perspective view of a front portion of the cambering vehicle shown in FIG. 24, with particular attention to the front ski.

A perspective view of a front ski 600 is shown in FIG. 26. As shown, the ski 600 may comprise a jagged surface 602 which is relatively flat at its rear section 604 and mid-section 606, but curves upward at its front section 608. The jagged surface 602 depicted in FIG. 26 comprises three distinct levels, an upper level 610, mid-level 612, and lower level 614. Each of the levels 610, 612, 614 is connected by a relatively vertical member 616.

Extending upward from the jagged surface 602, and spanning the width of the jagged surface 602, is a base 618. The base 618 provides a flat surface upon which a H-shaped member 620 is mounted. Such mounting is preferably achieved by utilizing fasteners 622, such as bolts. Between the base 618 and the H-shaped member 620, there may be included bushings 624 to cushion or otherwise dampen movement between the two members.

Figure 27:
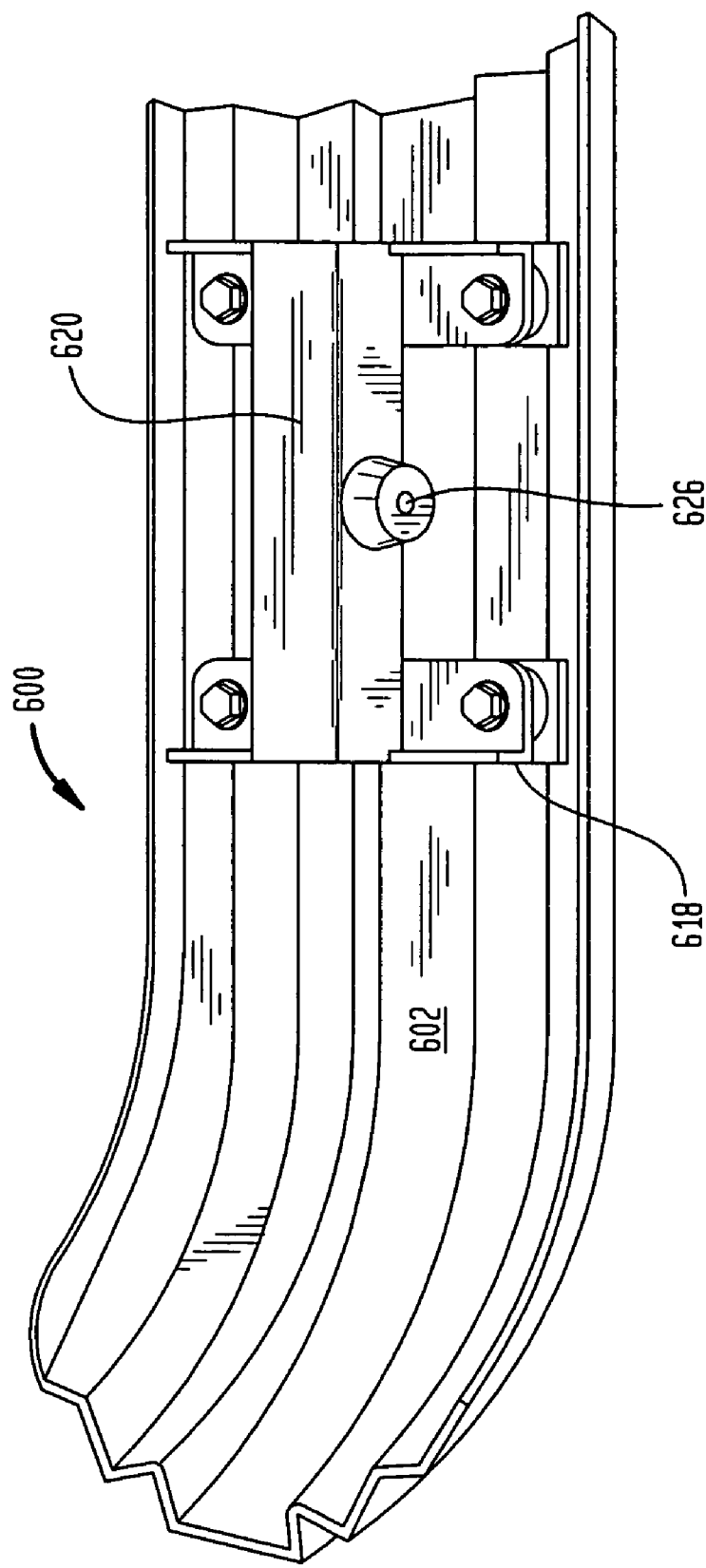
FIG. 27 depicts a perspective view of the front ski shown in FIG. 26.

As shown more clearly in FIG. 27, the H-shaped member 620 may include an aperture 626 through which the axle 560 of the front fork 531 may extend to mount the ski 600 to the cambering vehicle 501. The fork 531 may include a block 570 spanning between the two legs 572, 574 of the fork. Mounted on the block 570 may be bushings 576. When the ski 600 is mounted to the fork 531, the bushings 576 preferably rest against the H-shaped member 620 such that rotation of the ski about the axle 560 is dampened.

Figure 28:
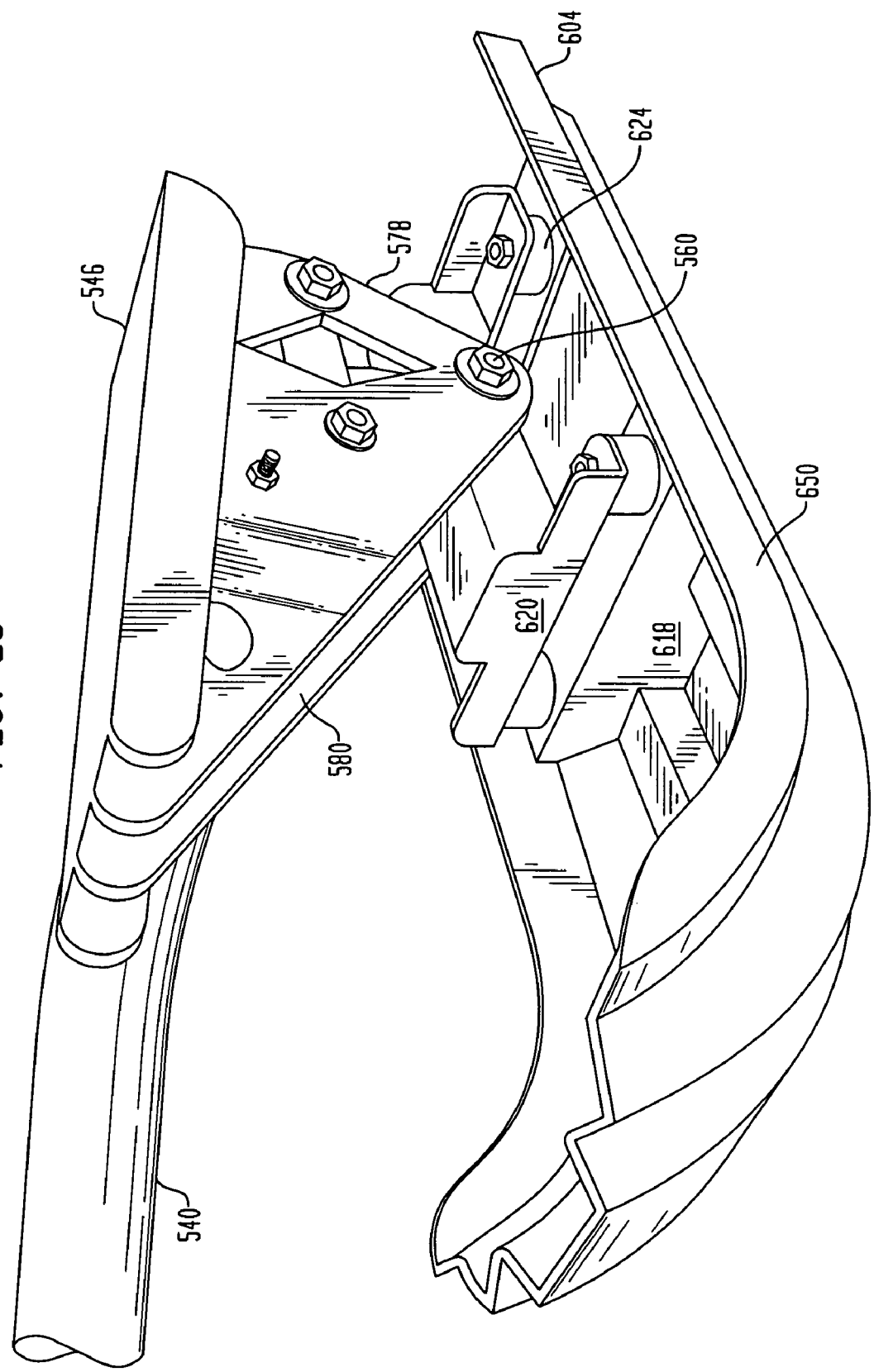
FIG. 28 depicts a perspective view of a rear portion of the cambering vehicle shown in FIG. 24, with particular attention to the rear ski.

FIG. 28 depicts a perspective view of a rear ski 650 attached to a trailing arm 540 of a cambering vehicle 501 in accordance with certain aspects of the present invention. It will be appreciated that the rear ski 650 is virtually identical to the front ski 600. However, in preferred embodiments, the rear ski 650 includes a rear section 604 which is slightly longer than the rear section 604 of the front ski 600. Thus, the rear section 604 will extend out farther from the H-shaped member 620, to provide additional surface area for the ski 650.

As with the legs 572, 574 of the fork 531, the trailing arms 540 of the cambering vehicle 501 include opposed members 578, 580 which may be utilized to mount the ski 650. The opposed members 578, 580 depicted in FIG. 28 are triangular shaped, but may be any other suitable shape, so long as they include an aperture (not shown) through which the axle 560 may mount.

It will be appreciated that although the cambering vehicle 501 depicted in FIGS. 24-28 is shown with skis 600, 650 attached, the vehicle may also be provided with wheels (not shown). If so provided, the skis will simply disconnect by unlatching or unbolting of the axles 560, removing the skis, replacing the skis with wheels, and reinstalling the axle through the center of the wheel. In this regard, the cambering vehicle 501 is suitable for use on dry land, as well as water, snow or ice.

Furthermore, it will be appreciated that conventional cambering vehicles, such as that shown in FIG. 1, may be retrofitted with skis, such as skis 600, 650 shown in FIGS. 26-28. The retrofitting method is relatively simple, and typically is achieved by dismounting the wheels 132, 145 of the cambering vehicle 101 by removing the axle securing them to the fork 131 and trailing arms 140, respectively, substituting therefore the skis 600, 650, and replacing the axle to secure the skis.

It will also be appreciated that the cambering vehicle may comprise a single front ski associated with the front column and a single rear ski associated with both the first trailing arm and the second trailing arm. Alternatively, a single ski may be associated with the front column, the first trailing arm, and the second trailing arm.

Although this invention has been described with a certain degree of particularity, it is to be understood that the present disclosure has been made by way of example only and that numerous changes in the detailed construction and the combination and arrangement of parts may be resorted to without departing from the spirit of the invention as hereinafter claimed.

The invention claimed is:

1. A cambering vehicle for human propelled transport comprising:

an elongate front column;

first and second pivot axles at said front column, said first and second pivot axles being inclined downwardly;

a first trailing arm pivotally attached to said first pivot axle;

a second trailing arm pivotally attached to said second pivot axle;

a front ski associated with said elongate front column, said front ski having a suspension component to dampen movement of said front ski relative to said front column; and, first and second rear skis associated with said first and second trailing arms.

2. The cambering vehicle of claim 1, further comprising a handlebar associated with said front column, said handlebar being adapted to selectively rotate said front ski.

3. The cambering vehicle of claim 2, further comprising a brake lever associated with said handlebar and a brake mechanism associated with said first rear ski, said brake lever adapted to selectively engage and disengage said brake mechanism to selectively slow said cambering vehicle.

4. The cambering vehicle of claim 3, wherein said brake mechanism is engaged when said brake lever is farthest from said handlebar and is disengaged when said brake lever is closest to said handlebar.

5. The cambering vehicle of claim 1, wherein said vehicle is adapted for use on snow, ice, or water.

6. The cambering vehicle of claim 1, further comprising folding mechanisms associated with each of said trailing arms, said folding mechanisms incorporating a pivot pin about which said trailing arms may fold.

7. The cambering vehicle of claim 1, wherein said first rear ski further comprises a suspension component to dampen movement of said first rear ski relative to said first trailing arm.

8. A kit including components capable for adaptation into a cambering vehicle for human propelled transport, said kit comprising:

a base unit having an elongate front column, first and second pivot axles at said front column, the pivot axles being inclined downwardly, a first trailing arm pivotally attached to said first pivot axle, and a second trailing arm pivotally attached to said second pivot axle;

a front ski having a suspension component to dampen movement of said front ski relative to said front column and a front wheel, each of said front ski and said front wheel adapted to be independently associated with said elongate front column;

a first rear ski and a first rear wheel, each of said first rear ski and said first rear wheel adapted to be independently associated with said first trailing arm; and, a second rear ski and a second rear wheel, each of said second rear ski and said second rear wheel adapted to be independently associated with said second trailing arm.

9. The kit of claim 8, wherein said front ski, said first rear ski and said second rear ski may be associated with said base unit in a first configuration to assemble a cambering vehicle for use on snow, ice, or water.

10. The kit of claim 9, wherein said front wheel, said first rear wheel and said second rear wheel may be associated with said base unit in a second configuration to assemble a cambering vehicle for use on land.

11. A cambering vehicle for human propelled transport comprising:

an elongate front column;

first and second pivot axles at said front column, said pivot axles being inclined downwardly;

a first trailing arm pivotally attached to said first pivot axle; and, a second trailing arm pivotally attached to said second pivot axle;

wherein said front column, said first trailing arm, and said second trailing arm, are adapted for connection with either wheels or a skis.

12. A ski adapted for attachment to a conventional cambering vehicle having a front tube with a fork and downwardly declining pivot axles for attaching trailing arms, said ski comprising:

a surface having a rear section, midsection, and front section, said surface being relatively flat at its rear section and mid-section, but curving upward at its front section;

an attachment mechanism for attachment to the fork;

a suspension component for dampening movement of said ski relative to said fork.

13. The ski of claim 12, wherein said conventional cambering vehicle further comprises an axle associated with the fork, said attachment mechanism further comprising a member having an aperture therethrough, said aperture adapted to receive the axle of said fork.

14. A method of converting a conventional cambering vehicle adapted for use on land into a cambering vehicle adapted for use on snow, ice, or water, wherein the conventional cambering vehicle includes a front tube having a front fork with a wheel connected to the front fork by an axle and downwardly declining pivot axles for connection of trailing arms, said method comprising:

removing the axle and wheel from the front fork;

replacing the wheel with a ski having a suspension component; and, reinserting the axle through fork and a portion of the ski to connect the ski to the fork.

15. A kit including components for adaptation of a conventional cambering vehicle for human propelled transport land with downwardly depending pivot axles into a cambering vehicle for human propelled transport on snow, ice, or water, said kit comprising:

a front ski having a suspension component, a first rear ski, and a second rear ski, each of said skis including members adapted to be connected to the conventional cambering vehicle to enable said cambering vehicle to be utilized for human propelled transport on snow, ice, or water.

16. The kit of claim 15, wherein the conventional cambering vehicle includes wheels, the front ski, first rear ski, and second rear ski being capable of connection with the cambering vehicle with the wheels still in place.

17. A cambering vehicle for human propelled transport comprising:

an elongate front column; first and second downwardly depending pivot axles at said front column; a first trailing arm pivotally attached to said first pivot axle; a second trailing arm pivotally attached to said second pivot axle; a ski associated with each of said elongate front column, said first trailing arm, and said second trailing arm.

18. A cambering vehicle for human propelled transport comprising:

an elongate front column;

first and second downwardly dependent pivot axles at said front column;

a first trailing arm pivotally attached to said first pivot axle;

a second trailing arm pivotally attached to said second pivot axle;

a first ski associated with said elongate front column, said first ski having a suspension component; and, a second ski associated with said first trailing arm and said second trailing arm.

19. A cambering vehicle for human propelled transport comprising:
   an elongate front column;
   first and second pivot axles at said front column, said pivot axles depending downwardly
   a first trailing arm pivotally attached to said first pivot axle;
   a second trailing arm pivotally attached to said second pivot axle;
   a front ski associated with said elongate front column; and,
   first and second rear skis associated with said first and second trailing arms, said first rear ski having a suspension component to dampen movement of said first rear ski relative to said first trailing arm.

20. A cambering vehicle for human propelled transport comprising:
   an elongate front column;
   first and second pivot axles at said front column, said pivot axles being inclined downwardly;
   a first trailing arm pivotally attached to said first pivot axle;
   a second trailing arm pivotally attached to said second pivot axle;
   a front ski associated with said elongate front column; and,
   first and second rear skis associated with said first and second trailing arms.

21. A kit including components capable for adaptation into a cambering vehicle for human propelled transport, said kit comprising:
   a base unit having an elongate front column, first and second pivot axles at said front column and inclined downwardly, a first trailing arm pivotally attached to said first pivot axle, and a second trailing arm pivotally attached to said second pivot axle;
   a front ski and a front wheel, each of said front ski and said front wheel adapted to be independently associated with said elongate front column;
   a first rear ski and a first rear wheel, each of said first rear ski and said first rear wheel adapted to be independently associated with said first trailing arm; and,
   a second rear ski and a second rear wheel, each of said second rear ski and said second rear wheel adapted to be independently associated with said second trailing arm.

22. A cambering vehicle for human propelled transport comprising:
   an elongate front column;
   first and second pivot axles at said front column, said first and second pivot axles being inclined downwardly;
   a first trailing arm pivotally attached to said first pivot axle;
   a second trailing arm pivotally attached to said second pivot axle;
   a ski associated with said elongate front column, said first trailing arm, and said second trailing arm.

* * * * *